United States Patent
Irie

(10) Patent No.: US 10,608,737 B2
(45) Date of Patent: Mar. 31, 2020

(54) TRANSMISSION DEVICE AND SELECTION METHOD FOR MODULATION SCHEME

(71) Applicant: FUJITSU LIMITED, Kawasaki-shi, Kanagawa (JP)

(72) Inventor: Hiroyuki Irie, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/432,005

(22) Filed: Jun. 5, 2019

(65) Prior Publication Data

US 2019/0379461 A1 Dec. 12, 2019

(30) Foreign Application Priority Data

Jun. 11, 2018 (JP) .................... 2018-110905

(51) Int. Cl.
*H04B 10/073* (2013.01)
*H04B 10/572* (2013.01)
*H04B 10/079* (2013.01)
*H04J 14/06* (2006.01)

(52) U.S. Cl.
CPC ..... *H04B 10/073* (2013.01); *H04B 10/07951* (2013.01); *H04B 10/572* (2013.01); *H04J 14/06* (2013.01)

(58) Field of Classification Search
CPC ............ H04B 10/073; H04B 10/07951; H04B 10/572; H04J 14/06
See application file for complete search history.

(56) References Cited

U.S. PATENT DOCUMENTS

| 2004/0071381 A1 | 4/2004 | Szafraniec et al. | |
| 2005/0201758 A1* | 9/2005 | Isomura | H04B 10/2569 398/158 |
| 2011/0142446 A1* | 6/2011 | Lyubomirsky | H04J 14/0278 398/43 |

FOREIGN PATENT DOCUMENTS

| JP | 2004-138615 | 5/2004 |
| JP | 2015-188165 | 10/2015 |

OTHER PUBLICATIONS

M. Karlsson et al., "Autocorrelation function of the polarization-mode dispersion vector", Optics Letters, vol. 24, No. 14, pp. 939-941, Jul. 1999 (3 pages).

(Continued)

*Primary Examiner* — Casey L Kretzer
(74) *Attorney, Agent, or Firm* — Fujitsu Patent Center

(57) ABSTRACT

A transmission device includes a memory, and a processor coupled to the memory and configured to acquire a polarization mode dispersion value of each of wavelengths of a polarization-multiplexed optical signal having a wavelength, multiply a mean value of the polarization mode dispersion values of the wavelengths by a prescribed ratio, to thereby calculate a maximum value of the polarization mode dispersion value that is temporally varied, and select a multi-level modulation scheme of the polarization-multiplexed optical signal based on an index value of transmission quality of the polarization-multiplexed optical signal depending on the maximum value.

12 Claims, 15 Drawing Sheets

(56) References Cited

OTHER PUBLICATIONS

Md. S. Faruk et al., "Multi-Impairments Monitoring from the Equalizer in a Digital Coherent Optical Receiver", Th.10. A.1, ECOC 2010, 3 pages, Sep. 19-23, 2010, Torino, Italy (3 pages).
M. Karlsson et al., "Long-Term Measurement of PMD and Polarization Drift in Installed Fibers", Journal of Lightwave Technology, vol. 18, No. 7, pp. 941-951, Jul. 2000 (3 pages).
Itu-T Recommendation, Telecommunication Standardization Sector of ITU, Series G: Transmission Systems and Media, Digital Systems and Networks, G. 680, (Jul. 2007), pp. 1-58 (68 pages).

\* cited by examiner

FIG. 5
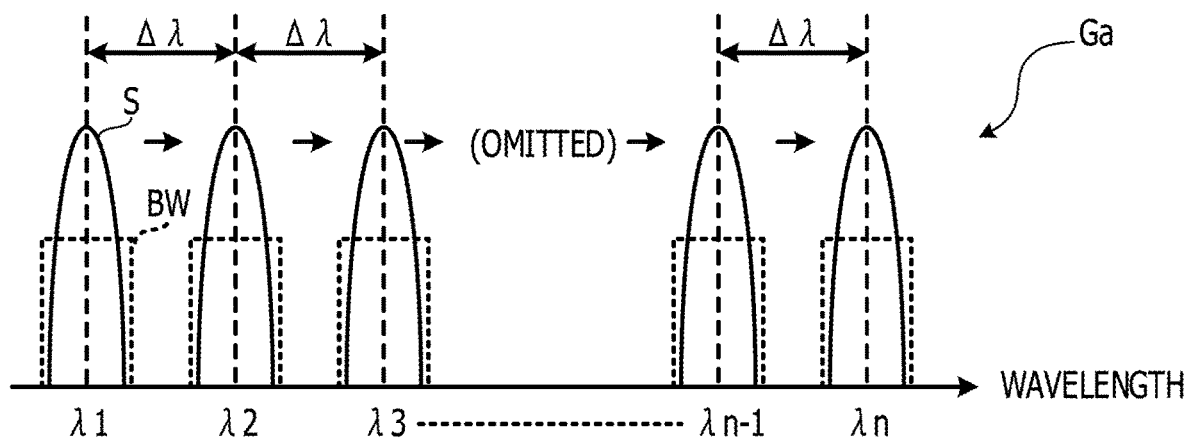
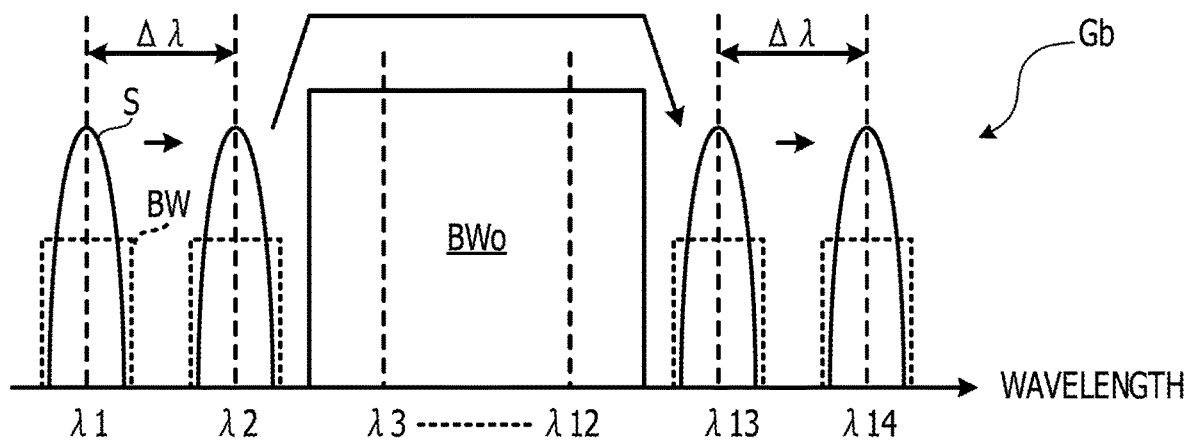

| DEVICE ID | WAVELENGTH (nm) |
|---|---|
| #1 | 1554 |
| #2 | 1562 |
| ... | ... |

Gd — 801

| WAVELENGTH (nm) | PMD VALUE |
|---|---|
| 1540 | Q1 |
| 1542 | Q2 |
| 1544 | Q3 |
| 1546 | Q4 |
| ... | ... |
| 1558 | Qn-1 |
| 1560 | Qn |

Ge — 802

| MODE ID | BER |
|---|---|
| #1 | R1 |
| #2 | R2 |
| #3 | R3 |

FIG. 7

| Ratio of max. to mean | Probability of exceeding max. |
|---|---|
| 3.0 | $4.2 \times 10^{-5}$ |
| 3.2 | $9.2 \times 10^{-6}$ |
| 3.4 | $1.8 \times 10^{-6}$ |
| 3.6 | $3.2 \times 10^{-7}$ |
| 3.8 | $5.1 \times 10^{-8}$ |
| 4.0 | $7.4 \times 10^{-9}$ |
| 4.2 | $9.6 \times 10^{-10}$ |
| 4.4 | $1.1 \times 10^{-10}$ |
| 4.6 | $1.2 \times 10^{-11}$ |

FIG. 8
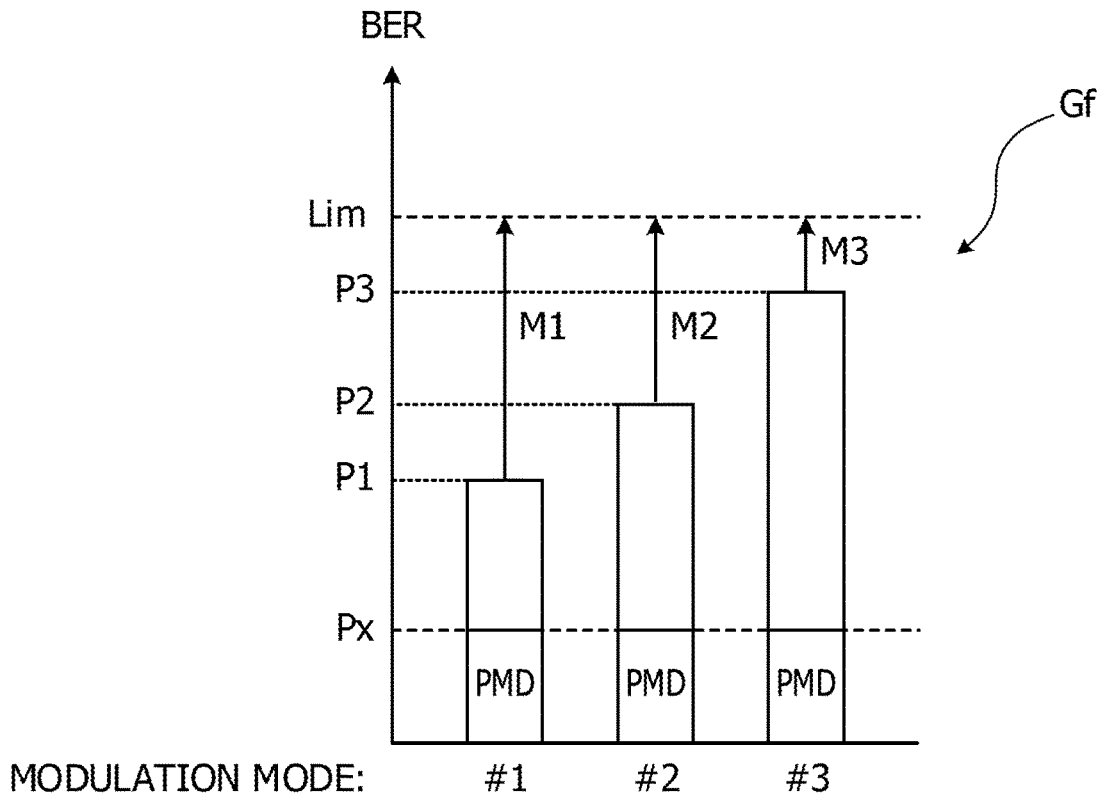
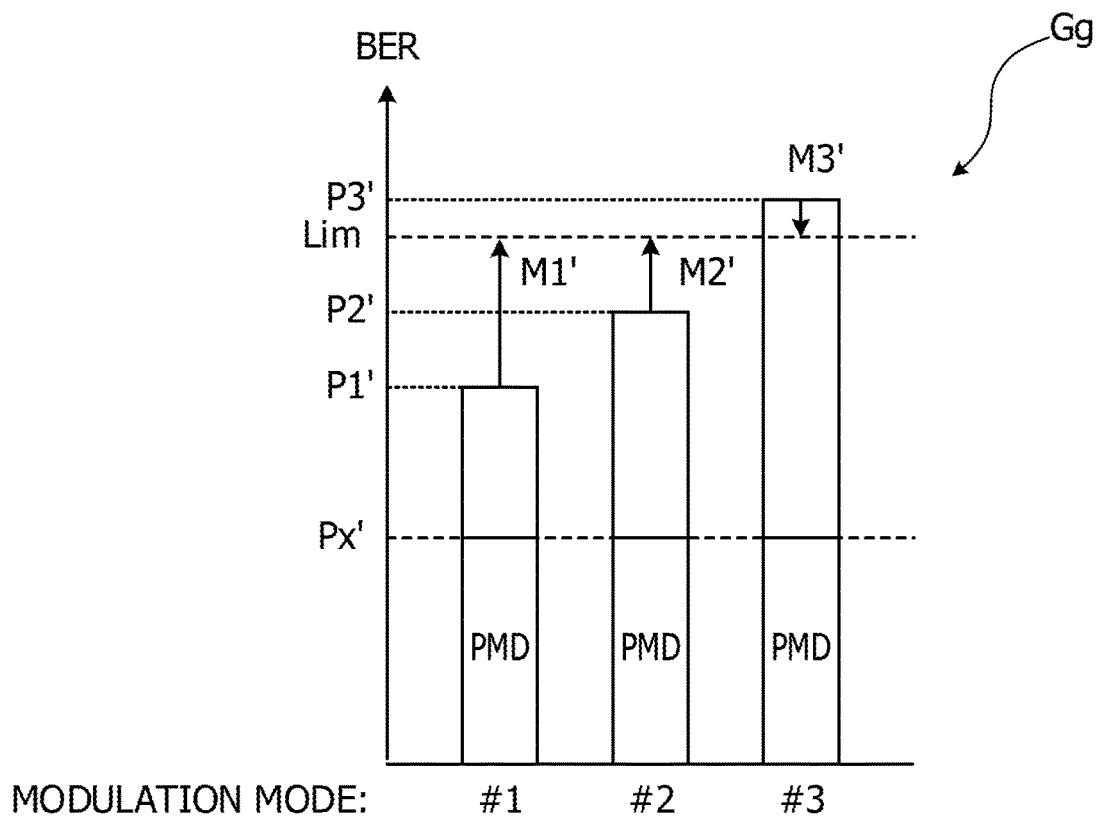

TRANSMISSION DEVICE AND SELECTION METHOD FOR MODULATION SCHEME

CROSS-REFERENCE TO RELATED APPLICATION

This application is based upon and claims the benefit of priority of the prior Japanese Patent Application No. 2018-110905, filed on Jun. 11, 2018, the entire contents of which are incorporated herein by reference.

FIELD

The embodiment discussed herein is related to a transmission device and a selection method for a modulation scheme.

BACKGROUND

As one of optical signal transmission schemes, for example, there is a digital coherent light transmission scheme. The digital coherent light transmission scheme uses, as modulation schemes for polarization-multiplexed optical signals, multi-level modulation schemes such as quadrature phase shift keying (QPSK) and quadrature amplitude modulation (16-QAM). Improvement of the performance of digital signal processors (DSPs), analog-digital converters, and digital-to-analog converters in recent years has made it possible to select one scheme from a plurality of multi-level modulation schemes.

The selection of the multi-level modulation schemes is made in consideration of a transmission distance of a polarization-multiplexed optical signal and various penalties that are generated in a transmission path. Factors of this kinds of penalties include amplified spontaneous emission (ASE) noise, a nonlinear optical effect such as self-phase modulation, polarization mode dispersion (PMD), and polarization dependent loss (PDL).

The penalty is measured as, for example, the bit error rate (BER) of the polarization-multiplexed optical signal in a receiving device as a result. For example, a difference between an actually measured BER and the limit value (for example, $1.0 \times 10^{-2}$) of error correction capability of a forward error correction (FEC) code is regarded as a margin in a transmission system. In the selection of the multi-level modulation schemes, for example, the BER in each multi-level modulation scheme is measured, and from the measurement results, a multi-level modulation scheme providing the smallest margin is selected so that the highest possible transmission speed is achieved.

For example, as the related art, Japanese Laid-open Patent Publication No. 2015-188165 and Japanese Laid-open Patent Publication No. 2004-138615 have been published.

The PMD is varied with temporal probability due to birefringence that is caused by external stress or distortion of a core of an optical fiber, for example. Thus, in the selection of the multi-level modulation schemes, the margin is desirably provided in consideration of the maximum value of the PMD.

In view of this, if BER measurement is performed for a long period of time (for example, a few months), the maximum value of the PMD may be measured, but it is difficult to take such a long period of time to set the transmission system in reality. The maximum value of the PMD is accordingly estimated based on a design value such as the specified value of the optical fiber to be used in the selection of the multi-level modulation schemes.

The accuracy of estimate of the PDM based on the design value is, however, not high, and an inappropriate multi-level modulation scheme may be selected, with the result that a margin excessively larger than the actual one may be provided.

In view of the foregoing, a transmission device and a selection method for a modulation scheme that may select an appropriate multi-level modulation scheme are desirably provided.

SUMMARY

According to an aspect of the embodiment, a transmission device includes a memory, and a processor coupled to the memory and configured to acquire a polarization mode dispersion value of each of wavelengths of a polarization-multiplexed optical signal having a wavelength, multiply a mean value of the polarization mode dispersion values of the wavelengths by a prescribed ratio, to thereby calculate a maximum value of the polarization mode dispersion value that is temporally varied, and select a multi-level modulation scheme of the polarization-multiplexed optical signal based on an index value of transmission quality of the polarization-multiplexed optical signal depending on the maximum value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a spectrum waveform diagram illustrating an example of wavelength change;

FIG. 6 illustrates examples of a wavelength assignment database, a PMD value database, and a BER database;

FIG. 7 is a diagram illustrating Table 9-2 of International Telecommunication Union Telecommunication Standardization Sector (ITU-T) Recommendation G. 680;

FIG. 8 is a diagram illustrating an example of a BER in each modulation mode;

DESCRIPTION OF EMBODIMENT

Figure 1:
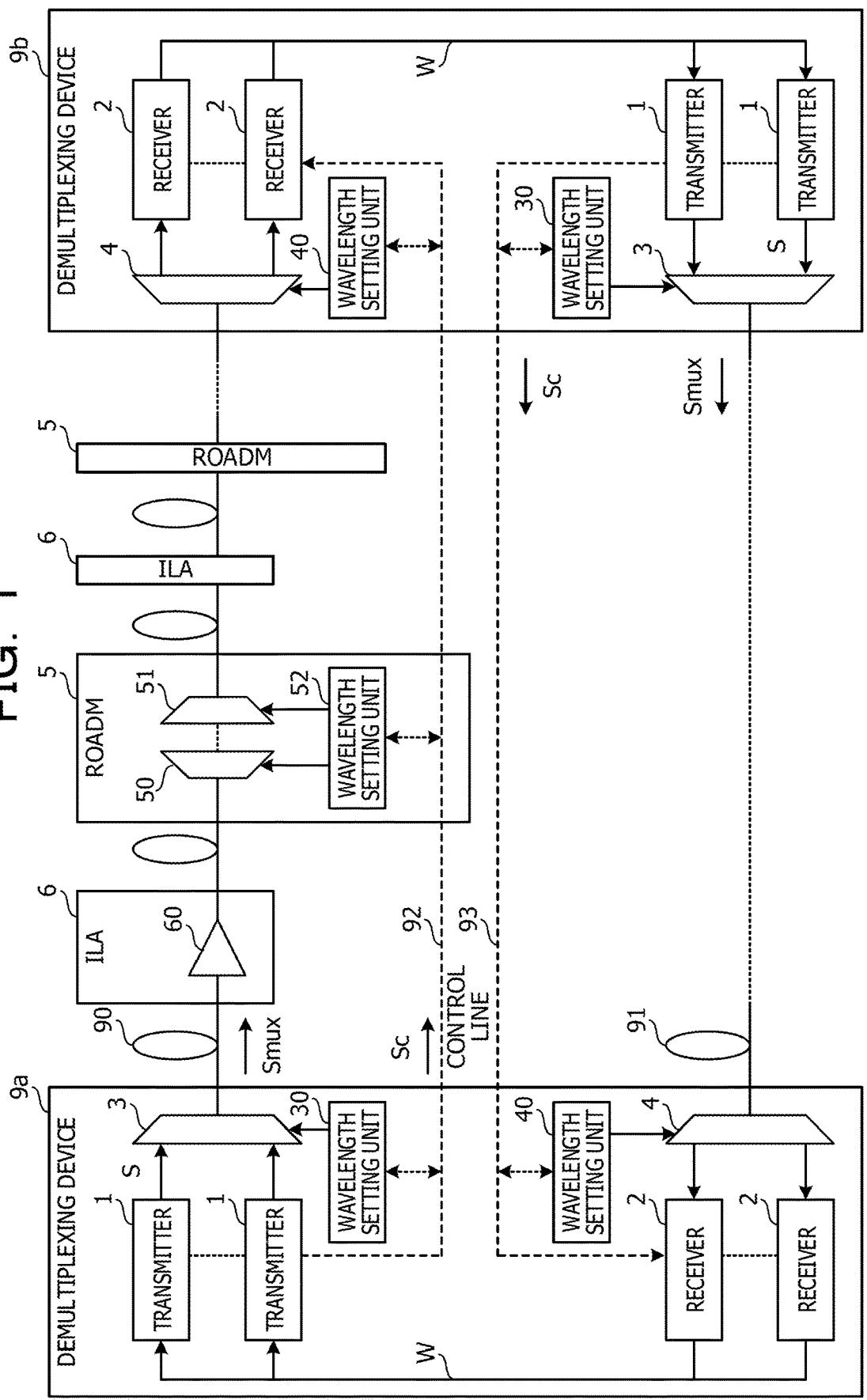
FIG. 1 is a configuration diagram illustrating an example of a transmission system.

FIG. 1 is a configuration diagram illustrating an example of a transmission system. The transmission system includes a pair of demultiplexing devices 9a and 9b coupled to each other via transmission paths 90 and 91 such as optical fibers, and a plurality of inline amplifiers (ILAs) 6 and a reconfigurable optical add and drop multiplexer (ROADM) 5 coupled on the transmission path 90.

The demultiplexing devices 9a and 9b each include a plurality of transmitters 1 and receivers 2, a wavelength multiplexing unit 3, a wavelength demultiplexing unit 4, and wavelength setting units 30 and 40. The transmitter 1 transmits a polarization-multiplexed optical signal S to the receiver 2 in accordance with a digital coherent light transmission scheme. The transmitter 1 and the receiver 2 are each an example of a transmission device such as a transponder, and a selection method for a modulation scheme according to an embodiment is performed by the operation of the transmitter 1 or the receiver 2 described later.

The wavelength multiplexing unit 3 is, for example, a wavelength selective switch (WSS). The wavelength multiplexing unit 3 selects the wavelength of the polarization-multiplexed optical signal S that is input to each input port thereof from the transmitter 1, and wavelength-multiplexes the input polarization-multiplexed optical signal S to output the resultant to the transmission paths 90 and 91 as a wavelength-multiplexed optical signal Smux. The wavelength setting unit 30 sets the wavelength of the polarization-multiplexed optical signal S that is input to each input port of the wavelength multiplexing unit 3.

The wavelength demultiplexing unit 4 is, for example, a WSS. The wavelength demultiplexing unit 4 demultiplexes the polarization-multiplexed optical signal S having each wavelength from the wavelength-multiplexed optical signal Smux that is input thereto from the transmission paths 90 and 91, and outputs the polarization-multiplexed optical signal S to the receiver 2 from each output port thereof. The wavelength setting unit 40 sets the wavelength of the polarization-multiplexed optical signal S that is output from each output port of the wavelength demultiplexing unit 4.

The wavelength-multiplexed optical signal arrives at the receiver 2 via the plurality of ILAs 6 and the ROADM 5. The illustration of the ILAs 6 and the ROADM 5 on the transmission path 91 is omitted.

The ILA 6 includes, for example, an erbium doped fiber amplifier (EDFA) 60, and the EDFA 60 amplifies the wavelength-multiplexed optical signal Smux.

The ROADM 5 includes, for example, an input-side WSS 50 and an output-side WSS 51. The input-side WSS 50 demultiplexes a polarization-multiplexed optical signal having a drop target wavelength from the wavelength-multiplexed optical signal Smux. The output-side WSS 51 multiplexes the wavelength-multiplexed optical signal Smux that is input thereto from the input-side WSS 50 and a polarization-multiplexed optical signal having an add target wavelength. The ROADM 5 includes a wavelength setting unit 52, and the wavelength setting unit 52 sets the drop target wavelength and the add target wavelength to the input-side WSS 50 and the output-side WSS 51, respectively.

The transmitters 1 of one of the demultiplexing devices 9a and 9b each communicate with the receiver 2 of the other of the demultiplexing devices 9b and 9a via control lines 92 and 93. The control lines 92 and 93 may be accommodated in the transmission paths 90 and 91 for the wavelength-multiplexed optical signal Smux, or may be accommodated in transmission paths different from the transmission paths 90 and 91, for example.

The transmitter 1 of the demultiplexing device 9a transmits a control signal Sc to the receiver 2 of the demultiplexing device 9b via the control line 92. The control signal Sc is transmitted with the use of a wavelength dedicated for control data between the transmitter 1 and the receiver 2, for example.

For example, the transmitter 1 of the demultiplexing device 9a may set, with the control line 92, the wavelength of the polarization-multiplexed optical signal S to each of the wavelength setting units 30, 40, and 52 and the receiver 2 that is a destination of the polarization-multiplexed optical signal S. The transmitter 1 of the demultiplexing device 9b may transmit the control signal Sc to the receiver 2 of the demultiplexing device 9a via the control line 93, to thereby perform control similar to the above-mentioned one.

In each of the demultiplexing devices 9a and 9b, the receiver 2 transfers the control signal Sc to the transmitter 1 via a backboard line W provided on the back surface of the housing, for example. This allows the transmitter 1 of the demultiplexing device 9a to transmit the control signal Sc to the receiver 2 of the demultiplexing device 9b and receive the control signal Sc from the receiver 2 in question.

For example, the receiver 2 of the demultiplexing device 9b generates the control signal Sc as a response to the control signal Sc that the receiver 2 has received from the transmitter 1 of the demultiplexing device 9a, and transfers the control signal Sc to the transmitter 1 via the backboard line W. The transmitter 1 transmits the control signal Sc to the receiver 2 of the demultiplexing device 9a, which is the other of the demultiplexing devices, via the control line 93. The receiver 2 transfers the control signal Sc to the transmitter 1 via the backboard line W. The receiver 2 of the demultiplexing device 9a may transmit the control signal Sc to the transmitter 1 of the demultiplexing device 9b in a manner similar to the above-mentioned one.

In the following example, in the transmission of the polarization-multiplexed optical signal S from the transmitter 1 of the demultiplexing device 9a to the receiver 2 of the demultiplexing device 9b, an appropriate multi-level modulation scheme is selected from the penalty of PMD that is generated in the transmission path 90, so that the appropriate multi-level modulation scheme is set to the transmitter 1 and the receiver 2.

Figure 2:
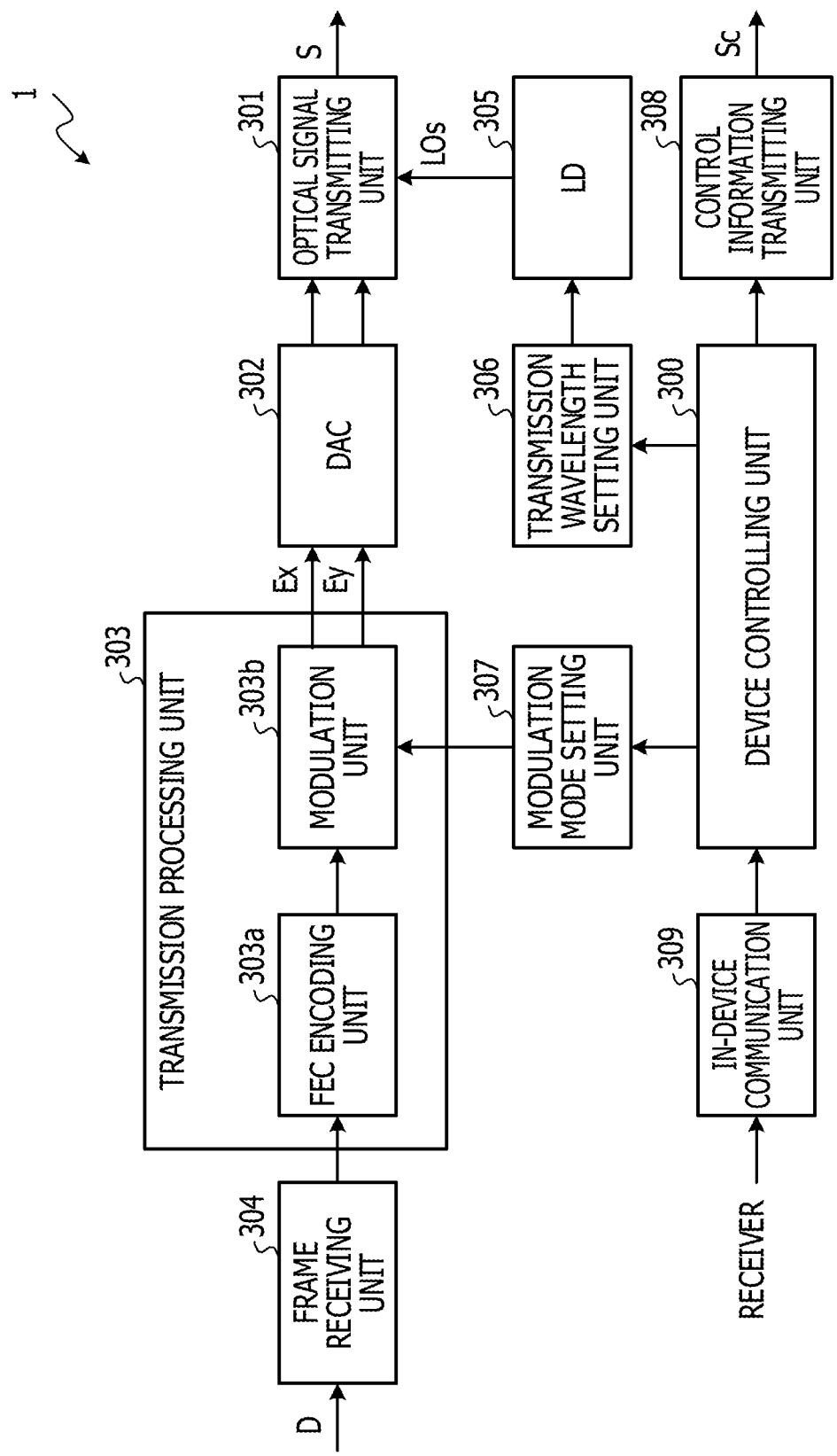
FIG. 2 is a configuration diagram illustrating an example of a transmitter.

FIG. 2 is a configuration diagram illustrating an example of a transmitter. The transmitter illustrated in FIG. 2 may be the transmitter 1 illustrated in FIG. 1. The transmitter 1 includes a device controlling unit 300, an optical signal transmitting unit 301, a digital-analog converter (DAC) 302, a transmission processing unit 303, a frame receiving unit 304, a laser diode (LD) 305, a transmission wavelength setting unit 306, a modulation mode setting unit 307, a control information transmitting unit 308, and an in-device communication unit 309.

The frame receiving unit 304 receives a data signal D such as an Ethernet (registered trademark, the same applies hereinafter) signal from a client network. The frame receiving unit 304 converts the frame of the data signal D into another format and outputs the resultant to the transmission processing unit 303.

The transmission processing unit 303 includes an FEC encoding unit 303a and a modulation unit 303b. The FEC encoding unit 303a gives an FEC code to the data signal D as an example of an error correction code. The FEC encoding unit 303a outputs the data signal D to the modulation unit 303b.

The modulation unit 303b modulates the data signal D by one of a plurality of multi-level modulation schemes. The multi-level modulation schemes include, for example, QPSK, 8-QAM, and 16-QAM, but are not limited thereto. The modulation unit 303b maps the data signal D to the symbol of constellation depending on a multi-level modulation scheme of a modulation mode set by the modulation mode setting unit 307. The modulation unit 303b outputs, to the DAC 302, electric field signals Ex and Ey depending on two polarized waves generated by mapping.

The DAC 302 converts the electric field signals Ex and Ey from digital signals to analog signals. The DAC 302 outputs the electric field signals Ex and Ey that are the analog signals to the optical signal transmitting unit 301.

The optical signal transmitting unit 301 generates the polarization-multiplexed optical signal S from the electric field signals Ex and Ey, and transmits the polarization-multiplexed optical signal S to the transmission path 90. The optical signal transmitting unit 301 demultiplexes transmitted light LOs that is input thereto from the LD 305 into two polarized components orthogonal to each other by a polarization beam splitter, for example. The optical signal transmitting unit 301 optically modulates the two polarized components based on the respective electric field signals Ex and Ey, and multiplexes the resultant by a polarization beam combiner, to thereby generate the polarization-multiplexed optical signal S. As described later, before the transmitter 1 enters an operation state, the polarization-multiplexed optical signal S that the optical signal transmitting unit 301 transmits is used for acquiring polarization mode dispersion values (hereinafter referred to as "PMD value") or BERs.

The LD 305 generates the transmitted light LOs having a center frequency that is a frequency set by the transmission wavelength setting unit 306. The optical signal transmitting unit 301 is an example of a receiving unit.

The in-device communication unit 309 receives the control signal Sc from the receiver 2 via the backboard line W. The in-device communication unit 309 outputs the control signal Sc to the device controlling unit 300.

The device controlling unit 300 executes a series of control processing processes for selecting an appropriate multi-level modulation scheme. When selecting a multi-level modulation scheme, the device controlling unit 300 notifies the modulation mode setting unit 307 of a modulation mode corresponding to the multi-level modulation scheme in question.

The device controlling unit 300 controls the wavelength of the polarization-multiplexed optical signal S in the control processing. The device controlling unit 300 thus notifies the transmission wavelength setting unit 306 of the wavelength. The transmission wavelength setting unit 306 sets a center frequency depending on the wavelength to the LD 305.

The device controlling unit 300 transmits the control signal Sc including various pieces of control information to the receiver 2 that is a destination of the polarization-multiplexed optical signal S. The device controlling unit 300 outputs the control signal Sc to the control information transmitting unit 308. The control information transmitting unit 308 outputs the control signal Sc to the control line 92.

The frame receiving unit 304, the transmission processing unit 303, the DAC 302, the modulation mode setting unit 307, the transmission wavelength setting unit 306, the control information transmitting unit 308, and the in-device communication unit 309 each include a circuit such as a digital signal processor (DSP) or a field programmable gate array (FPGA).

Figure 3:
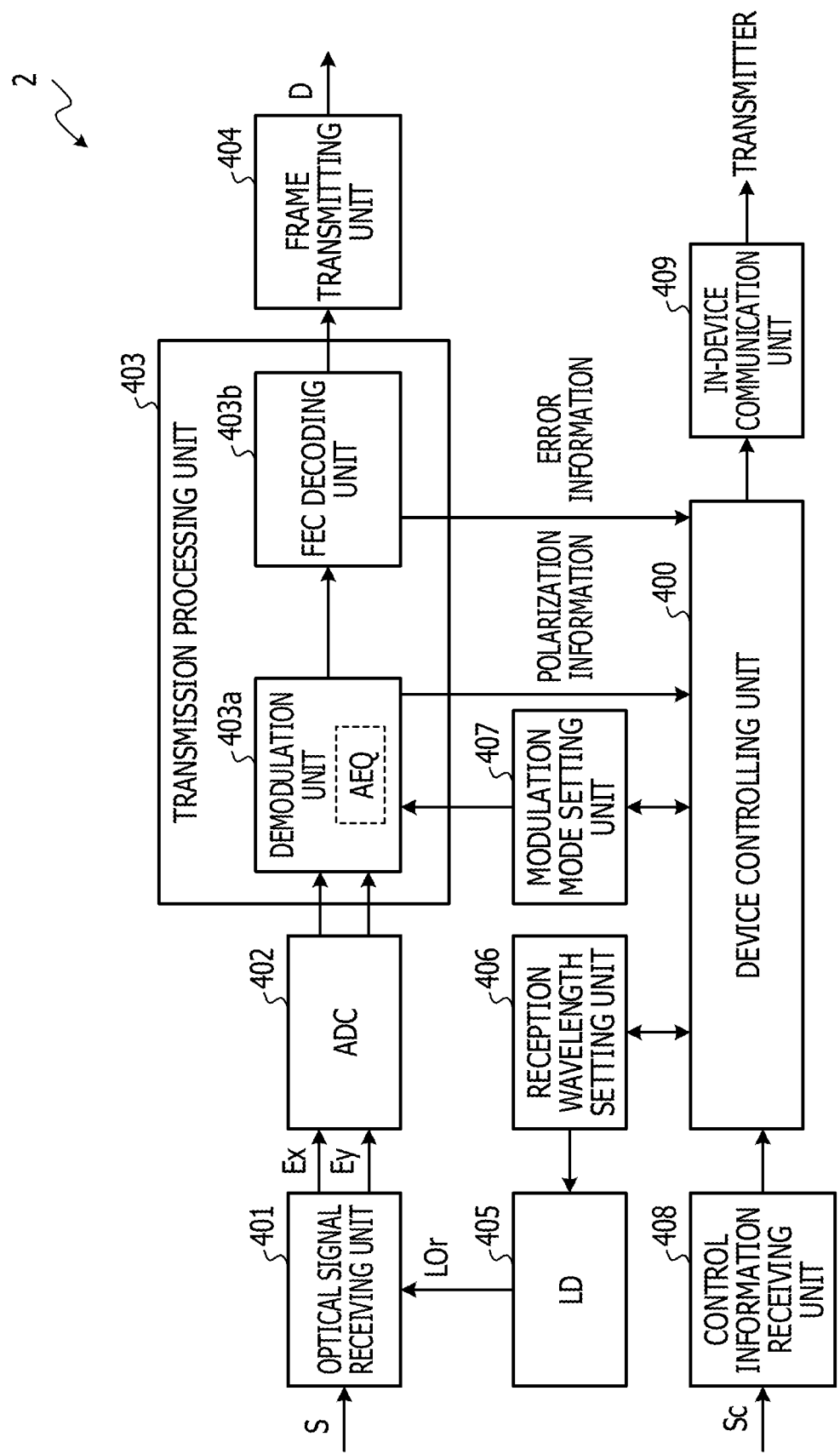
FIG. 3 is a configuration diagram illustrating an example of a receiver.

FIG. 3 is a configuration diagram illustrating an example of a receiver. The receiver illustrated in FIG. 3 may be the receiver 2 illustrated in FIG. 1. The receiver 2 includes a device controlling unit 400, an optical signal receiving unit 401, an analog-digital converter (ADC) 402, a reception processing unit 403, a frame transmitting unit 404, an LD 405, a reception wavelength setting unit 406, a modulation mode setting unit 407, a control information receiving unit 408, and an in-device communication unit 409.

The optical signal receiving unit 401 is, for example, an optical front end, and receives the polarization-multiplexed optical signal S. The optical signal receiving unit 401 demultiplexes the polarization-multiplexed optical signal S into two polarized components by a polarization beam splitter, and detects each polarized component with local oscillator light LOr that is input thereto from the LD 405. The optical signal receiving unit 401 photoelectrically converts each detected polarized component to generate the electric field signals Ex and Ey, and outputs the electric field signals Ex and Ey to the ADC 402.

The LD 405 generates the local oscillator light LOr having a center frequency that is a frequency set by the reception wavelength setting unit 406. The ADC 402 converts the electric field signals Ex and Ey from analog signals to digital signals. The ADC 402 outputs the electric field signals Ex and Ey that are the digital signals to the reception processing unit 403.

The reception processing unit 403 includes a demodulation unit 403a and an FEC decoding unit 403b. The demodulation unit 403a compensates for waveform distortion or polarization rotation of the polarization-multiplexed optical signal S that occurs due to wavelength dispersion or a nonlinear optical effect in the transmission path 90, for example. With this, the demodulation unit 403a demodulates the electric field signals Ex and Ey to the data signal D.

The demodulation unit 403a demodulates the electric field signals Ex and Ey depending on a modulation mode set by the modulation mode setting unit 407. The demodulation unit 403a performs the demodulation processing by an adaptive equalization circuit AEQ. The demodulation unit 403a outputs, for example, the tap coefficient of an FIR filter of the adaptive equalization circuit AEQ to the device controlling unit 400 as polarization information representing the polarization state of the polarization-multiplexed optical signal S. The demodulation unit 403a outputs the data signal D to the FEC decoding unit 403b.

The FEC decoding unit 403b performs data error correction processing of a data signal with the FEC code included in the data signal D. The FEC decoding unit 403b outputs, to the device controlling unit 400, error information on an error that the FEC decoding unit 403b detects in the error correction processing. The error information includes, for example, the number of bits of an error detected in one frame, but is not limited thereto. The FEC decoding unit 403b outputs the data signal D to the frame transmitting unit 404.

The frame transmitting unit 404 converts, for example, the frame format of the data signal D. The frame transmitting unit 404 outputs the data signal D to the client network.

The control information receiving unit 408 receives the control signal Sc from the transmitter 1 that is a source of the polarization-multiplexed optical signal S. The control information receiving unit 408 outputs the control signal Sc to the device controlling unit 400.

The device controlling unit 400 executes, in cooperation with the device controlling unit 300 of the transmitter 1, the series of control processing processes for selecting an appropriate multi-level modulation scheme. When selecting a multi-level modulation scheme, the device controlling unit 400 notifies the modulation mode setting unit 407 of a modulation mode corresponding to the multi-level modulation scheme in question.

The device controlling unit 400 controls the wavelength of the polarization-multiplexed optical signal S in the control processing. The device controlling unit 400 thus notifies the reception wavelength setting unit 406 of the wavelength. The reception wavelength setting unit 406 sets a center frequency depending on the wavelength to the LD 405.

The device controlling unit 400 transmits the control signal Sc including various pieces of control information to the transmitter 1 that is a source of the polarization-multiplexed optical signal S. The device controlling unit 400 thus outputs the control signal Sc to the in-device communication unit 409. The in-device communication unit 409 transmits the control signal Sc to the transmitter 1 via the backboard line W. With this, the control signal Sc arrives at the transmitter 1 of the demultiplexing device 9b via the control line 92.

The ADC 402, the reception processing unit 403, the frame transmitting unit 404, the reception wavelength setting unit 406, the modulation mode setting unit 407, the control information receiving unit 408, and the in-device communication unit 409 each include a circuit such as a DSP or an FPGA.

Figure 4:
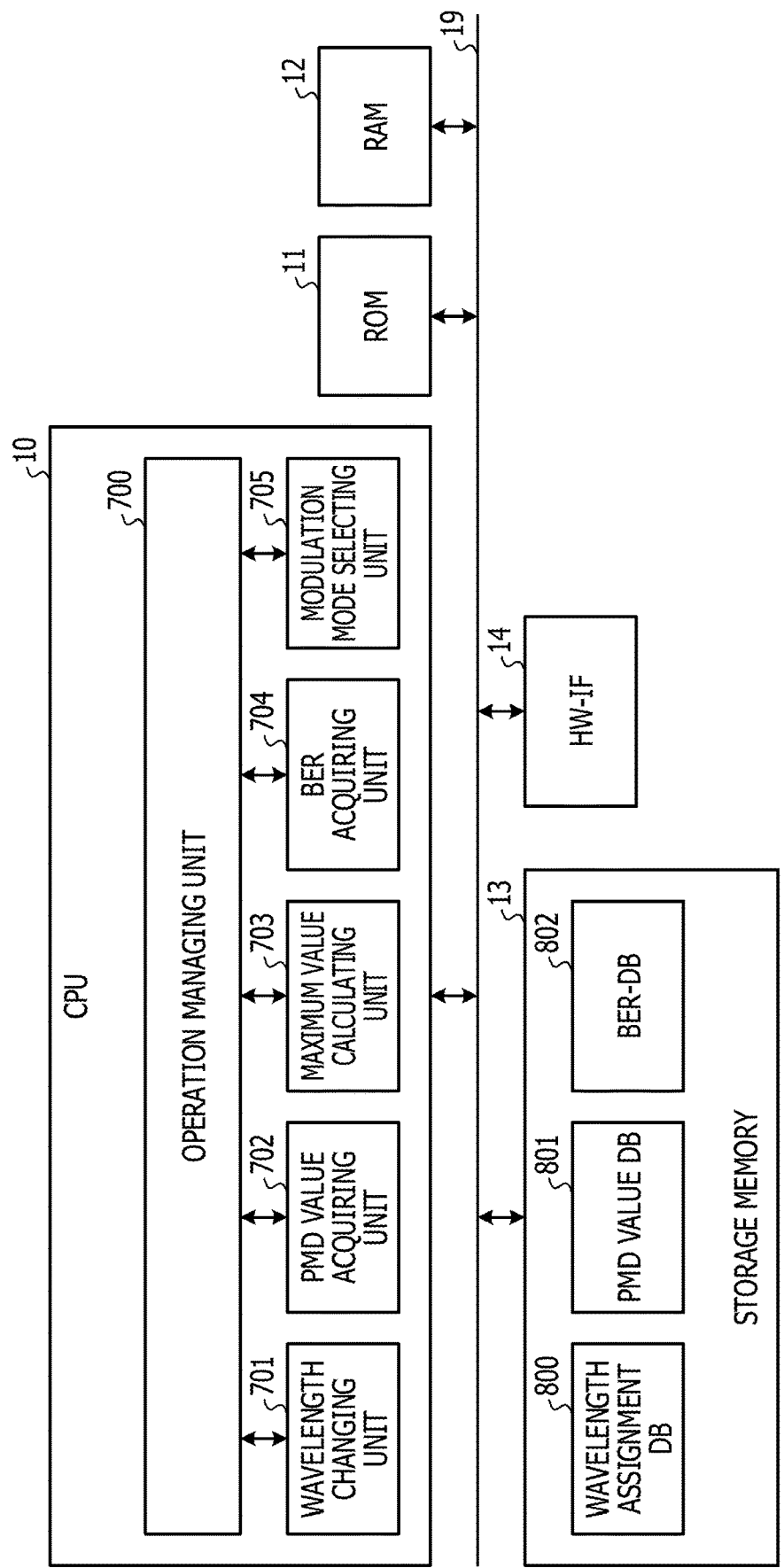
FIG. 4 is a configuration diagram illustrating an example of a device controlling unit of a transmitter.

FIG. 4 is a configuration diagram illustrating an example of a device controlling unit of a transmitter. The device controlling unit and the transmitter illustrated by reference to FIG. 4 may be the device controlling unit 300 and the transmitter 1, respectively, illustrated in FIG. 2. The device controlling unit 300 includes a central processing unit (CPU) 10, a read only memory (ROM) 11, a random access memory (RAM) 12, a storage memory 13, and a hardware interface unit (HW-IF) 14. The CPU 10 is coupled to the ROM 11, the RAM 12, the storage memory 13, and the HW-IF 14 via a bus 19 so that the CPU 10 may receive/output signals from/to the components.

The ROM 11 stores a program for driving the CPU 10. The RAM 12 functions as the working memory of the CPU 10. The HW-IF 14 relays communication between the CPU 10 and the transmission wavelength setting unit 306, the modulation mode setting unit 307, the control information transmitting unit 308, and the in-device communication unit 309.

The HW-IF 14 includes a circuit such as an FPGA. The HW-IF 14 transfers the control signal Sc that is input thereto from the CPU 10 to the in-device communication unit 409 so that the transmitter 1 of the demultiplexing device 9a, which is one of the demultiplexing devices, transmits the control signal Sc to the receiver 2 of the demultiplexing device 9b, which is the other of the demultiplexing devices.

When reading the program from the ROM 11, the CPU 10 forms, as its functions, an operation managing unit 700, a wavelength changing unit 701, a PMD value acquiring unit 702, a maximum value calculating unit 703, a BER acquiring unit 704, and a modulation mode selecting unit 705. The storage memory 13 stores a wavelength assignment database (DB) 800, a PMD value database (DB) 801, and a BER database (DB) 802.

The operation managing unit 700 manages a series of control sequences for selecting a modulation mode. The operation managing unit 700 instructs, in accordance with the control sequences, the operation of the wavelength changing unit 701, the PMD value acquiring unit 702, the maximum value calculating unit 703, the BER acquiring unit 704, and the modulation mode selecting unit 705.

The wavelength changing unit 701 changes the wavelength of the polarization-multiplexed optical signal S at prescribed intervals in the control sequences. The wavelength changing unit 701 notifies the transmission wavelength setting unit 306 of the wavelength to change the wavelength of the polarization-multiplexed optical signal S. The wavelength changing unit 701 is an example of a change processing unit.

The wavelength changing unit 701 transmits the control signal Sc for notifying the wavelength to the ROADM 5 so that the polarization-multiplexed optical signal S arrives at the receiver 2 via the ROADM 5. The wavelength setting unit 52 of the ROADM 5 sets, to the input-side WSS 50 and the output-side WSS 51, the wavelength notified from the control signal Sc. To the wavelength filters of the input-side WSS 50 and the output-side WSS 51, a transmission band depending on the wavelength of the polarization-multiplexed optical signal S is set. In addition, the wavelength changing unit 701 notifies the wavelength multiplexing unit 3 and the wavelength demultiplexing unit 4 of the wavelength in a manner similar to the above-mentioned one.

In this way, the wavelength changing unit 701 changes the transmission band of the wavelength filters on the transmission path 90 based on the wavelength of the polarization-multiplexed optical signal S. This allows the polarization-multiplexed optical signal S to arrive at the receiver 2 even when the ROADM 5 is coupled on the transmission path 90, for example.

The wavelength changing unit 701 transmits the control signal Sc similar to the above-mentioned one to the receiver 2. Thus, the wavelength of the polarization-multiplexed optical signal S is also set to the receiver 2.

FIG. 5 is a spectrum waveform diagram illustrating an example of wavelength change. The wavelength changing unit 701 changes the wavelength of the polarization-multiplexed optical signal S in order of $\lambda 1, \lambda 2, \lambda 3, \ldots, \lambda n-1$, and $\lambda n$ as indicated by reference symbol Ga (see the arrows).

The wavelength changing unit 701 changes, in addition to the wavelength, a transmission band BW of the wavelength filters of the input-side WSS 50 and the output-side WSS 51 based on the wavelength. The wavelength changing unit 701 transmits the control signal Sc for notifying the wavelength to the wavelength setting unit 52 of the ROADM 5 via the HW-IF 14, for example. In addition, the wavelength changing unit 701 transmits the control signal Sc similar to the above-mentioned one to the wavelength setting units 30 and 40 to change the transmission bands of the wavelength multiplexing unit 3 and the wavelength demultiplexing unit 4. This allows the polarization-multiplexed optical signal S to arrive at the receiver 2 even when the wavelength thereof is changed.

The receiver 2 transmits the control signal Sc including the polarization information on each wavelength to the transmitter 1. The PMD value acquiring unit 702 calculates the PMD value of each wavelength from the polarization information, and the maximum value calculating unit 703 calculates the mean value of the PMD values of the respective wavelengths.

An interval $\Delta\lambda$ between $\lambda 1, \lambda 2, \lambda 3, \ldots, \lambda n-1$, and $\lambda n$ (n: positive integer) has a fixed value. The interval $\Delta\lambda$ of the wavelength is set based on, for example, the autocorrelation of the PMD value related to the wavelength. With this, the mean value of the PMD values is efficiently calculated while a similarity between the optical pulses of the respective wavelengths is sufficiently reduced. 'Magnus Karlsson et al., "Autocorrelation function of the polarization-mode dispersion vector," OPTICS LETTERS, VOL. 24, No. 14, July 1999' describes Expression (6) for obtaining the autocorrelation of a PMD value from the mean value of differential group delays (DGDs).

The wavelength changing unit 701 changes the wavelength at prescribed intervals while avoiding a wavelength that another polarization-multiplexed optical signal is using as indicated by reference symbol Gb. A bandwidth BWo includes, as an example, the wavelengths λ3 to λ12 of a polarization-multiplexed optical signal that is transmitted from another transmitter 1.

The wavelength changing unit 701 changes the wavelength in order of λ1, λ2, λ13, and λ14 while avoiding the bandwidth BWo (see the arrows). Thus, even when another transmitter 1 is in the communication service operating state, the wavelength changing unit 701 may change the wavelength without affecting the communication service in question.

The wavelength changing unit 701 may recognize the bandwidth BWo in use by referring to the wavelength assignment DB 800, for example.

In FIG. 6, reference symbol Gc indicates an example of the wavelength assignment DB 800. In the wavelength assignment DB 800, device identifiers (IDs) (#1, #2, . . . ) for identifying the transmitters 1 and wavelengths assigned to the respective transmitters 1 are registered. The wavelength assignment DB 800 is registered by, for example, a network management device, which is not illustrated.

The wavelength changing unit 701 acquires, from the wavelength assignment DB 800, a wavelength assigned to another transmitter 1 other than the transmitter 1 including the wavelength changing unit 701 in question, to thereby recognize the bandwidth BWo in use.

With reference to FIG. 4 again, the PMD value acquiring unit 702 receives, every time the wavelength is changed, the control signal Sc that the receiver 2 has transmitted via the HW-IF 14. The control signal Sc includes the polarization information on each wavelength. The PMD value acquiring unit 702 acquires the PMD value of each wavelength from the polarization information.

The PMD value acquiring unit 702 estimates the PMD value from, for example, the tap coefficient of the adaptive equalization circuit AEQ that the polarization information represents. Such an estimation method is described in 'Md. Saifuddin Faruk et al., "Multi-Impairments Monitoring from the Equalizer in a Digital Coherent Optical Receiver," Th.10.A.1, ECOC 2010, 19-23 Sep. 2010, Torino, Italy,' for example.

The PMD value acquiring unit 702 acquires the PMD value of each wavelength and registers the PMD value in the PMD value DB 801. The PMD value acquiring unit 702 is an example of a dispersion value acquiring unit.

In FIG. 6, reference symbol Gd indicates an example of the PMD value DB 801. In the PMD value DB 801, the PMD value of each wavelength is registered. In the PMD value DB 801, as an example, PMD values Q1 to Qn in a case where the wavelength is changed from 1,540 to 1,560 (nm) at the interval Δλ of 2 (nm) are registered.

With reference to FIG. 4 again, the maximum value calculating unit 703 calculates the mean value of the PMD values of the respective wavelengths from the PMD value DB 801. The mean value of the PMD values of the respective wavelengths is substantially equal to the temporal mean value of the PMD values. This matter is described in 'Magnus Karlsson et al., "Long-Term Measurement of PMD and Polarization Drift in Installed Fibers," JOURNAL OF LIGHTWAVE TECHNOLOGY, VOL. 18, No. 7, July 2000,' for example.

The maximum value calculating unit 703 multiplies the mean value of the PMD values of the respective wavelengths by a prescribed ratio, to thereby calculate the maximum value of the PMD value that is temporally varied. The ratio of the maximum value to the mean value of the PMD values is described in Table 9-2 of ITU-T Recommendation G. 680, for example.

FIG. 7 is a diagram illustrating Table 9-2 of ITU-T Recommendation G. 680. "Ratio of max. to mean" corresponds to the ratio of the maximum value to the mean value of the PMD values. "Probability of exceeding max." corresponds to temporal probability with which the PMD value exceeds the maximum value.

The case where the PMD value exceeds the maximum value is considered to correspond to a state in which the transmission quality is significantly degraded so that the communication service is stopped. Some communication service providers set allowable values to annual communication service stop time, for example. As an example, when it is assumed that the allowable communication service stop time is five minutes per year, the temporal probability in this case is closest to $9.2 \times 10^{-6}$ (five minutes≈365 days×24 hours×60 minutes×60 seconds×$9.2 \times 10^{-6}$=290 seconds) of the values in "Probability of exceeding max."

Thus, in this case, 3.2 that is a value in "Ratio of max. to mean" corresponding to $9.2 \times 10^{-6}$ in "Probability of exceeding max." is used as the above-mentioned ratio. The maximum value calculating unit 703 multiplies the mean value of the PMD values by 3.2 to calculate the maximum value of the PMD value that is temporally varied.

This allows the maximum value calculating unit 703 to easily calculate the maximum value of the PMD value without performing measurement for a long period of time. The maximum value of the PMD value is calculated from the actually measured PMD values, and hence is more accurate than the one estimated based on a design value such as the specified value of the optical fiber. The maximum value calculating unit 703 is an example of a calculation unit. The ratio of the maximum value to the mean value of the PMD values is not limited to 3.2, and may be set depending on any value in "Probability of exceeding max."

The BER acquiring unit 704 acquires the BER of the polarization-multiplexed optical signal S in each multi-level modulation scheme. The BER is an example of an index value of the transmission quality of the polarization-multiplexed optical signal S, and the BER acquiring unit 704 is an example of a quality acquiring unit.

The BER acquiring unit 704 notifies the modulation mode setting unit 307 of the modulation mode. The BER acquiring unit 704 generates the control signal Sc for notifying the modulation mode, and transmits the control signal Sc to the receiver 2 via the HW-IF 14. With this, the transmitter 1 and the receiver 2 enter the common modulation mode.

The BER acquiring unit 704 acquires, from the wavelength assignment DB 800, a wavelength assigned to the transmitter 1 including the BER acquiring unit 704 in question, and notifies the transmission wavelength setting unit 306 of the wavelength. The optical signal transmitting unit 301 thus transmits the polarization-multiplexed optical signal S having the wavelength assigned to the transmitter 1 including the optical signal transmitting unit 301 in question. The receiver 2 transmits, to the transmitter 1, the control signal Sc including the error information on the polarization-multiplexed optical signal S in each modulation mode.

The BER acquiring unit 704 receives the control signal Sc that the receiver 2 has transmitted via the HW-IF 14. The BER acquiring unit 704 calculates the BER in each modulation mode from the error information included in the control signal Sc, and registers the BER in the BER-DB 802.

In FIG. 6, reference symbol Ge indicates an example of the BER-DB 802. In the BER-DB 802, the BER is registered for each mode ID for identifying the modulation mode. As an example, R1 to R3 are registered as the BERs corresponding to mode IDs #1 to #3. For example, the mode ID #1 represents the modulation mode of QPSK, the mode ID #2 represents the modulation mode of 8-QAM, and the mode ID #3 represents the modulation mode of 16-QAM.

With reference to FIG. 4 again, the modulation mode selecting unit 705 selects a multi-level modulation scheme based on the BER of the polarization-multiplexed optical signal S depending on the maximum value of the PMD value. The modulation mode selecting unit 705 selects a modulation mode in consideration of the maximum value of the PMD value so that the transmission system has the minimum margin.

For example, the modulation mode selecting unit 705 refers to the BER-DB 802 to acquire the BER in each modulation mode. The BER includes a PMD penalty, but the penalty in question is smaller than a penalty (hereinafter referred to as "maximum penalty") depending on the maximum value of the PMD value that is generated with temporal probability. The modulation mode selecting unit 705 thus calculates the maximum penalty from the maximum value of the PMD value based on the database measured in advance, for example, and corrects the BER in each modulation mode with the maximum penalty.

FIG. 8 is a diagram illustrating an example of a BER in each of modulation modes. Reference symbol Gf indicates a BER before correction, and reference symbol Gg indicates a BER after correction. In FIG. 8, #1 to #3 are the mode IDs of the modulation modes.

With reference to reference symbol Gf, the modulation mode selecting unit 705 acquires, from the BER-DB 802, P1 to P3 (P1<P2<P3) that are the BERs in the respective modulation modes #1 to #3. In P1 to P3, Px (<P1, P2, and P3) that is the PMD penalty (see "PMD") is included. The modulation mode selecting unit 705 converts, of the PMD values of the respective wavelengths registered in the PMD value DB 801, a PMD value depending on the wavelength of the transmitter 1 including the modulation mode selecting unit 705 in question to the PMD penalty Px. The PMD value is converted to the penalty based on, for example, a database stored in the storage memory 13 in advance, for example. The database is not illustrated.

Lim indicates a BER (for example, $1.0 \times 10^{-2}$) for the limit of correction capability of the FEC code. Differences between P1 to P3 in the respective modulation modes #1 to #3 and the limit value Lim are obtained as margins M1 to M3 (M1>M2>M3).

When the BER before correction is considered, the margin M3 in the modulation mode #3 is the minimum, and hence 16-QAM seems to be an appropriate multi-level modulation scheme. The PMD penalty Px included in P1 to P3 is, however, smaller than the maximum penalty, and hence 16-QAM may not be an appropriate multi-level modulation scheme.

With reference to reference symbol Gg, the modulation mode selecting unit 705 converts the maximum value of the PMD value calculated by the maximum value calculating unit 703 to a maximum penalty Px', and replaces the penalty Px with the maximum penalty Px', to thereby correct P1 to P3 to P1' to P3'.

$$P1'=P1-Px+Px' \quad (1)$$

$$P2'=P2-Px+Px' \quad (2)$$

$$P3'=P3-Px+Px' \quad (3)$$

The modulation mode selecting unit 705 calculates, from Expressions (1) to (3) above, P1' to P3' that are the BERs after correction. P1' to P3' after correction include the maximum penalty Px', and hence are highly accurate values taking the variation of the PMD value with temporal probability into consideration.

The modulation mode selecting unit 705 calculates margins M1' to M3' after correction from the differences between the limit value Lim and P1' to P3'. In the present example, P3 in the modulation mode #3 is larger than the limit value Lim, and hence the margin M3' is a negative value. Thus, the modulation mode #3 is not to be selected different from the above-mentioned selection result based on P1 to P3 before correction.

The margins M1' and M2' in the remaining modulation modes #1 and #2 are positive values, and a relationship of M1'>M2' is satisfied. The modulation mode selecting unit 705 thus selects the modulation mode #2 having a smaller margin. For example, the modulation mode selecting unit 705 selects 8-QAM as an appropriate multi-level modulation scheme.

The modulation mode selecting unit 705 notifies the modulation mode setting unit 307 of the selected modulation mode #2. The modulation mode setting unit 307 sets a multi-level modulation scheme depending on the selected modulation mode #2 to the modulation unit 303b. With this, the data signal D is modulated by the appropriate multi-level modulation scheme.

The modulation mode selecting unit 705 generates the control signal Sc for notifying the selected modulation mode #2, and transmits the control signal Sc to the receiver 2 via the HW-IF 14. With this, the transmitter 1 and the receiver 2 enter the common modulation mode.

In this way, the modulation mode selecting unit 705 corrects P1 to P3 that are the BERs in the respective modulation modes #1 to #3 based on the PMD penalty Px of the polarization-multiplexed optical signal S having the wavelength of the transmitter 1 including the modulation mode selecting unit 705 in question, and the maximum penalty Px' depending on the maximum value of the PMD value, to thereby select a multi-level modulation scheme from P1' to P3' that are the BERs after correction. This allows the modulation mode selecting unit 705 to select an appropriate multi-level modulation scheme with high accuracy from P1 to P3 in the respective multi-level modulation schemes that are obtained by actual measurement.

The modulation mode selecting unit 705 may select a multi-level modulation scheme based on, for example, the BER-DB 802 stored in the storage memory 13 in advance instead of the BER measured by the BER acquiring unit 704. In this case, the BER registered in the BER-DB 802 includes values calculated from simulation results and values measured in advance with the use of another transmitter 1 and another receiver 2.

Figure 9:
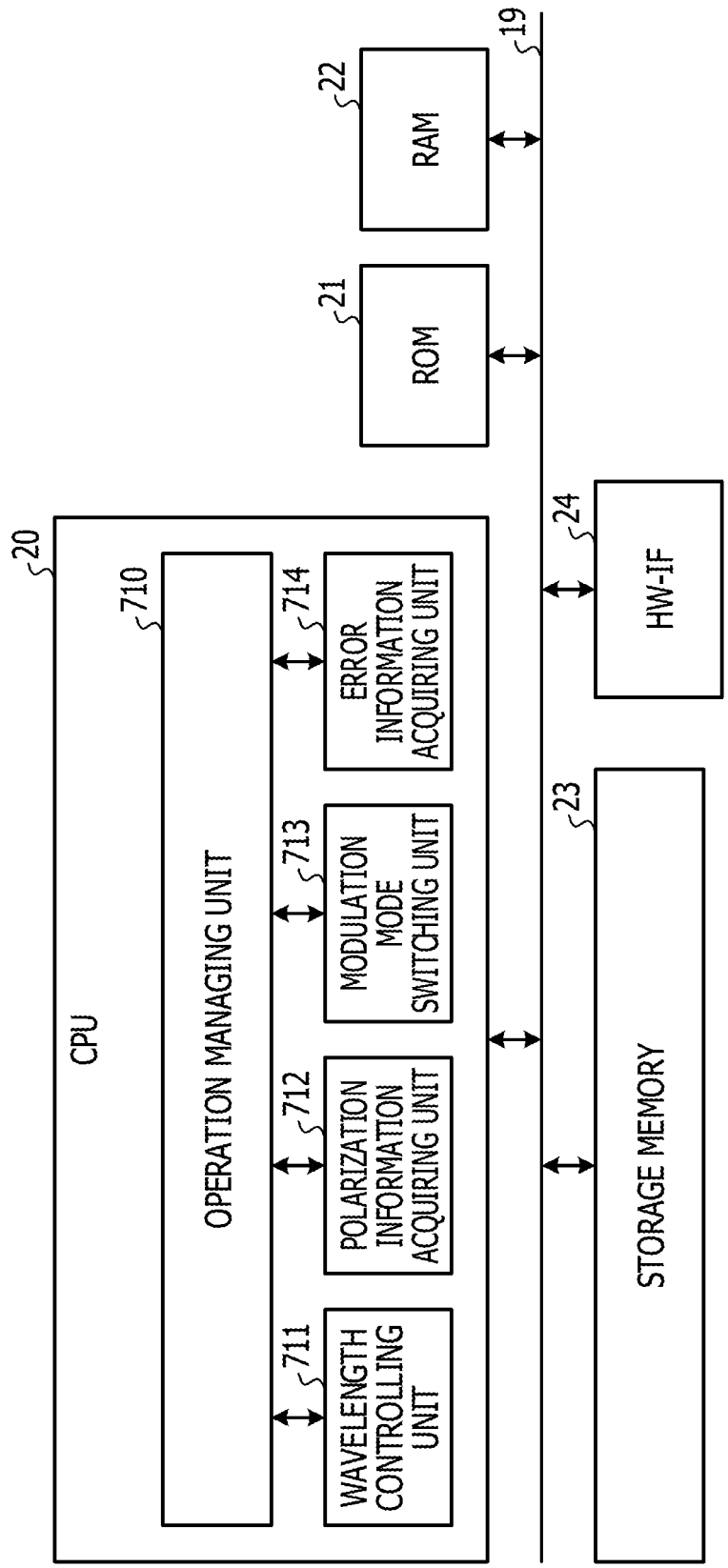
FIG. 9 is a configuration diagram illustrating an example of a device controlling unit of a receiver.

FIG. 9 is a configuration diagram illustrating an example of a device controlling unit of a receiver. The device controlling unit and the receiver illustrated by reference to FIG. 9 may be the device controlling unit 400 and the receiver 2, respectively, illustrated in FIG. 3. The device controlling unit 400 includes a CPU 20, a ROM 21, a RAM 22, a storage memory 23, and a hardware interface unit (HW-IF) 24. The CPU 20 is coupled to the ROM 21, the RAM 22, the storage memory 23, and the HW-IF 24 via a bus 29 so that the CPU 20 may receive/output signals from/to the components.

The ROM 21 stores a program for driving the CPU 20. The RAM 22 functions as the working memory of the CPU 20. The HW-IF 24 relays communication between the CPU 20 and the demodulation unit 403a, the FEC decoding unit 403b, the reception wavelength setting unit 406, the modulation mode setting unit 407, the control information receiving unit 408, and the in-device communication unit 409.

The HW-IF 24 includes a circuit such as an FPGA. The HW-IF 24 transfers the control signal Sc that is input thereto from the CPU 20 to the in-device communication unit 409 so that the receiver of the demultiplexing device 9b, which is one of the demultiplexing devices, transmits the control signal Sc to the transmitter 1 of the demultiplexing device 9a, which is the other of the demultiplexing devices.

When reading the program from the ROM 21, the CPU 20 forms, as its functions, an operation managing unit 710, a wavelength controlling unit 711, a polarization information acquiring unit 712, a modulation mode switching unit 713, and an error information acquiring unit 714.

The operation managing unit 710 manages a series of control sequences for selecting a modulation mode. The operation managing unit 710 instructs, in accordance with the control sequences, the operation of the wavelength controlling unit 711, the polarization information acquiring unit 712, the modulation mode switching unit 713, and the error information acquiring unit 714.

The wavelength controlling unit 711 receives the control signal Sc that the wavelength changing unit 701 of the transmitter 1 has transmitted via the HW-IF 24. The wavelength controlling unit 711 notifies the reception wavelength setting unit 406 of the wavelength instructed by the control signal Sc. With this, the center frequency of the local oscillator light LOr is changed, and the optical signal receiving unit 401 may receive the polarization-multiplexed optical signal S having the wavelength specified by the wavelength changing unit 701.

The polarization information acquiring unit 712 acquires the polarization information from the demodulation unit 403a every time the wavelength is changed. The polarization information acquiring unit 712 collects the polarization information in a prescribed unit of time from the demodulation unit 403a so that the PMD value acquiring unit 702 calculates an instantaneous PMD value. The polarization information acquiring unit 712 transmits the control signal Sc including the polarization information to the transmitter 1 via the HW-IF 24.

The modulation mode switching unit 713 receives the control signal Sc for notifying the modulation mode from the BER acquiring unit 704 and the modulation mode selecting unit 705 of the transmitter 1. The modulation mode switching unit 713 notifies the modulation mode setting unit 407 of the modulation mode instructed by the control signal Sc. The demodulation unit 403a thus performs the demodulation processing depending on the multi-level modulation scheme of the transmitter 1.

The error information acquiring unit 714 acquires the error information in each modulation mode from the FEC decoding unit 403b via the HW-IF 24. The error information acquiring unit 714 generates the control signal Sc including the error information, and transmits the control signal Sc to the transmitter 1 via the HW-IF 24.

Next, control sequences between the transmitter 1 and the receiver 2 are described.

Figure 10:
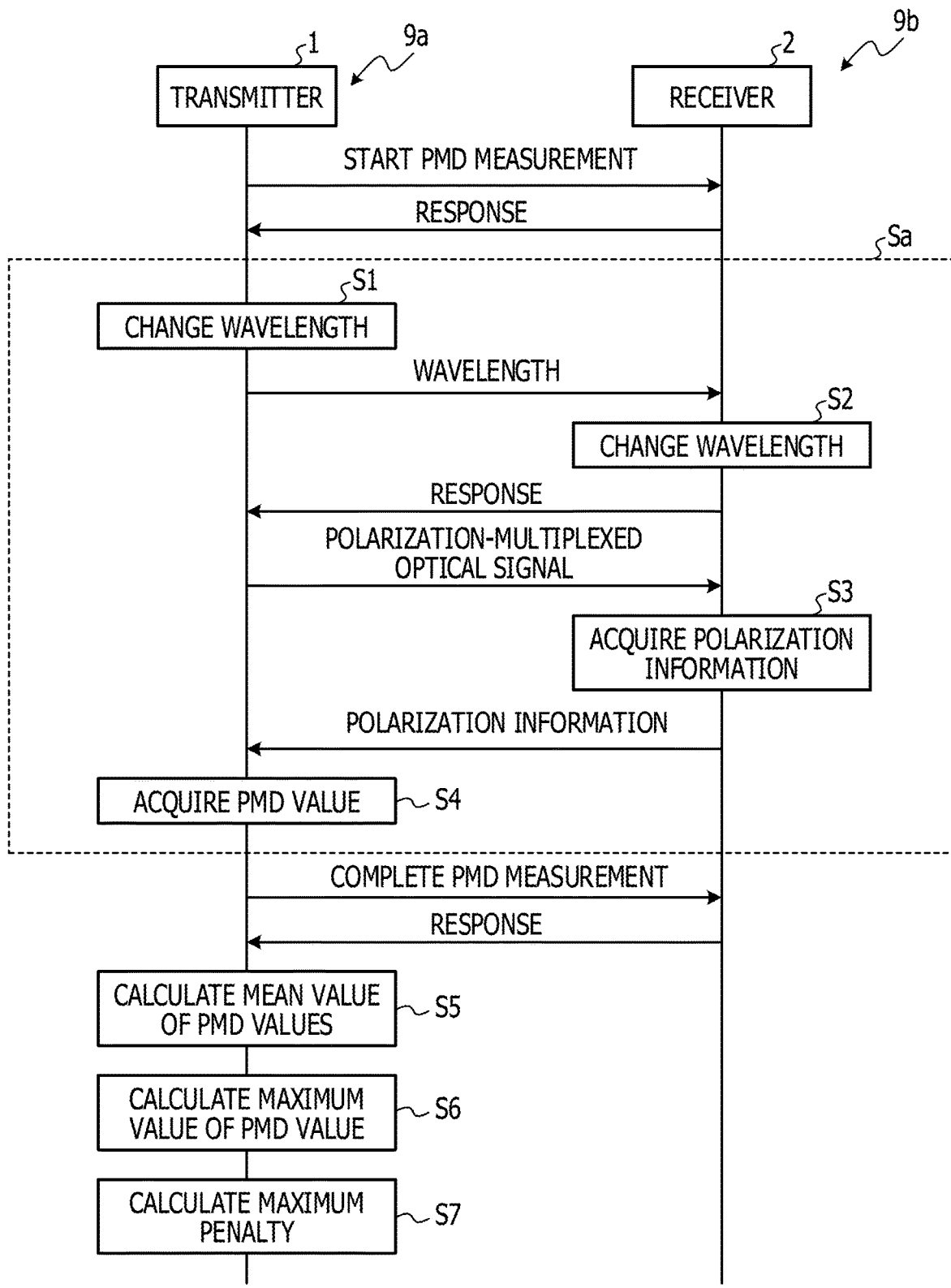
FIG. 10 is a sequence diagram (part 1) illustrating an example of control sequences between a transmitter and a receiver.
Figure 11:
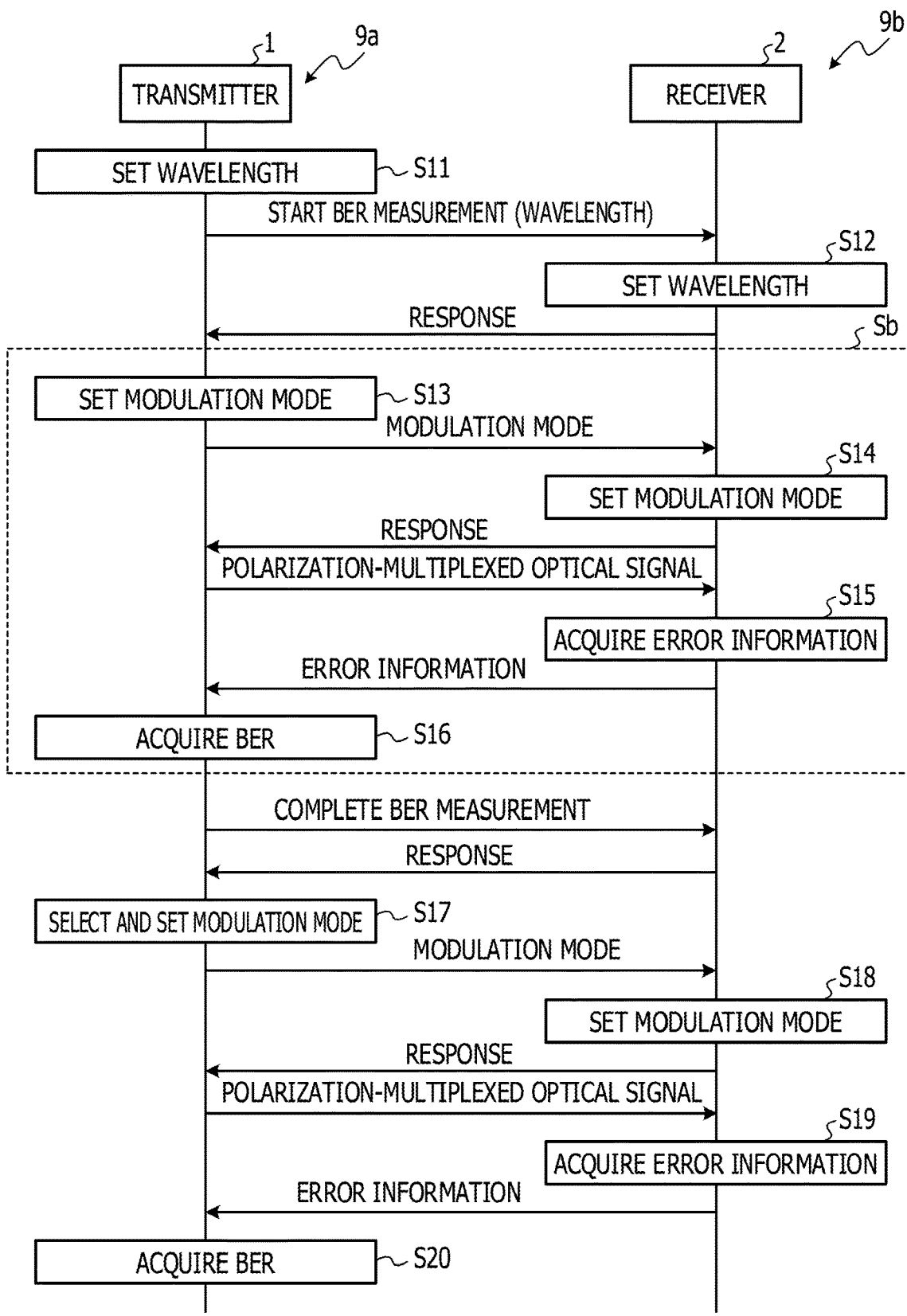
FIG. 11 is a sequence diagram (part 2) illustrating an example of control sequences between a transmitter and a receiver.

FIG. 10 and FIG. 11 are sequence diagrams illustrating an example of control sequences between a transmitter and a receiver. The transmitter and the receiver illustrated in FIG. 10 and FIG. 11 may be the transmitter 1 and the receiver 2, respectively, illustrated in FIG. 1. The control sequences are managed by the operation managing units 700 and 710 of the transmitter 1 and the receiver 2. The transmission/reception of control messages between the transmitter 1 and the receiver 2 described below is performed with the control signal Sc.

With reference to FIG. 10, the operation managing unit 700 of the transmitter 1 notifies the operation managing unit 710 of the receiver 2 of the start of the measurement of the PMD value. The operation managing unit 710 of the receiver 2 replies a response to the notification to the operation managing unit 700 of the transmitter 1.

Next, the wavelength changing unit 701 and the PMD value acquiring unit 702 perform measurement processing Sa of the PMD value of each wavelength in cooperation with each other. The measurement processing Sa of the PMD value is iteratively executed until the measurement of the PMD values of all the wavelengths, the number of which is determined in advance, is complete. In the measurement processing Sa of the PMD value, the initial value of the wavelength is not limited and a multi-level modulation scheme to be used is not limited either.

In the measurement processing Sa of the PMD value, the wavelength changing unit 701 notifies the transmission wavelength setting unit 306 of the wavelength to change the wavelength of the polarization-multiplexed optical signal S that is transmitted from the optical signal transmitting unit 301 (S1). Next, the wavelength changing unit 701 notifies the receiver 2 of the wavelength after change. The wavelength controlling unit 711 notifies the reception wavelength setting unit 406 of the notified wavelength, to thereby change the wavelength of the polarization-multiplexed optical signal S that the optical signal receiving unit 401 receives (S2).

After changing the wavelength, the wavelength controlling unit 711 transmits a response to the notification to the transmitter 1. The wavelength changing unit 701 changes, based on the wavelength change, the transmission band BW of the wavelength filters of the input-side WSS 50 and the output-side WSS 51 and the transmission bands of the wavelength multiplexing unit 3 and the wavelength demultiplexing unit 4.

Next, the polarization information acquiring unit 712 acquires, from the demodulation unit 403a, the polarization information on the polarization-multiplexed optical signal S received from the transmitter 1 (S3). The polarization information acquiring unit 712 transmits the polarization information to the transmitter 1.

The PMD value acquiring unit 702 acquires the PMD value depending on a current wavelength from the polarization information (S4). The PMD value is registered in the PMD value DB 801.

After the measurement processing Sa of the PMD value is complete for all the wavelengths, the operation managing unit 700 of the transmitter 1 notifies the receiver 2 of the measurement completion. The operation managing unit 710 of the receiver 2 transmits a response to the notification to the transmitter 1.

Next, the maximum value calculating unit 703 reads out the PMD value of each wavelength from the PMD value DB 801, and calculates the mean value of the PMD values (S5). The mean value corresponds to the temporal mean value of the PMD values as described above.

Next, the maximum value calculating unit 703 multiplies the mean value of the PMD values of the respective wavelengths by a prescribed ratio (for example, 3.2), to thereby calculate the maximum value of the PMD value that is temporally varied (S6). Then, the maximum value calculating unit 703 calculates the maximum penalty Px' from the maximum value of the PMD value (S7).

With reference to FIG. 11, the BER acquiring unit 704 reads out the wavelength of the transmitter 1 including the BER acquiring unit 704 in question from the wavelength assignment DB 800, and notifies the wavelength controlling unit 711 of the wavelength, to thereby set, to the wavelength of the transmitter 1 including the BER acquiring unit 704 in question, the wavelength of the polarization-multiplexed optical signal S that is transmitted from the optical signal transmitting unit 301 (S11). The BER acquiring unit 704 notifies the receiver 2 of the start of measurement processing Sb of the BER together with the wavelength of the transmitter 1 including the BER acquiring unit 704 in question.

The wavelength controlling unit 711 notifies the reception wavelength setting unit 406 of the notified wavelength to set the wavelength of the polarization-multiplexed optical signal S that the optical signal receiving unit 401 receives (S12). After setting the wavelength, the wavelength controlling unit 711 transmits a response to the notification to the transmitter 1. The wavelength changing unit 701 sets, based on the wavelength set by the BER acquiring unit 704, the transmission band BW of the wavelength filters of the input-side WSS 50 and the output-side WSS 51 and the transmission bands of the wavelength multiplexing unit 3 and the wavelength demultiplexing unit 4.

Next, the BER acquiring unit 704 executes the measurement processing Sb of the BER. The BER acquiring unit 704 iteratively executes the measurement processing Sb of the BER until completing the measurement of the BERs in all of the modulation modes #1 to #3.

The BER acquiring unit 704 notifies the modulation mode setting unit 307 of the modulation modes #1 to #3 in a prescribed order to set the modulation mode of the modulation unit 303b (S13). The modulation modes #1 to #3 are set in any order. Next, the BER acquiring unit 704 notifies the receiver 2 of the set modulation mode #1, #2, or #3.

The modulation mode switching unit 713 notifies the modulation mode setting unit 407 of the modulation mode #1, #2, or #3 notified from the transmitter 1 to set the modulation mode of the receiver 2 (S14). The modulation mode switching unit 713 transmits a response to the notification to the transmitter 1.

Next, the error information acquiring unit 714 acquires, from the FEC decoding unit 403b, the error information on the polarization-multiplexed optical signal S received from the transmitter 1 (S15). The error information acquiring unit 714 transmits the error information to the transmitter 1. The BER acquiring unit 704 acquires the BER in each of the modulation modes #1 to #3 from the error information (S16).

After the acquisition of the BERs in all of the modulation modes #1 to #3 is complete, the operation managing unit 700 of the transmitter 1 notifies the receiver 2 of the completion of the measurement processing Sb of the BER. The operation managing unit 710 of the receiver 2 replies a response to the notification to the transmitter 1.

Next, by the method described above, the modulation mode selecting unit 705 selects the modulation mode #1, #2, or #3 and notifies the modulation mode setting unit 307 of the selected one, to thereby set the selected modulation mode #1, #2, or #3 to the modulation unit 303b (S17). The modulation mode selecting unit 705 notifies the receiver 2 of the selected modulation mode.

The modulation mode switching unit 713 notifies the modulation mode setting unit 407 of the notified modulation mode to set the modulation mode (S18). Next, the modulation mode switching unit 713 replies a response to the notification to the transmitter 1.

Next, the error information acquiring unit 714 acquires, from the FEC decoding unit 403b, the error information on the polarization-multiplexed optical signal S received from the transmitter 1 (S19). The error information acquiring unit 714 transmits the error information to the transmitter 1.

The BER acquiring unit 704 acquires the BER from the error information (S20). When the BER is a prescribed reference value or smaller, for example, the operation managing unit 700 of the transmitter 1 makes the transmitter 1 shift to the operation state. When the BER exceeds the prescribed reference value, the operation managing unit 700 executes the control sequences again. In this way, the control sequences are executed.

In the present example, the transmitter 1 calculates the PMD value and the BER and selects the modulation mode #1, #2, or #3, but the receiver 2 may perform the calculation and the selection.

Figure 12:
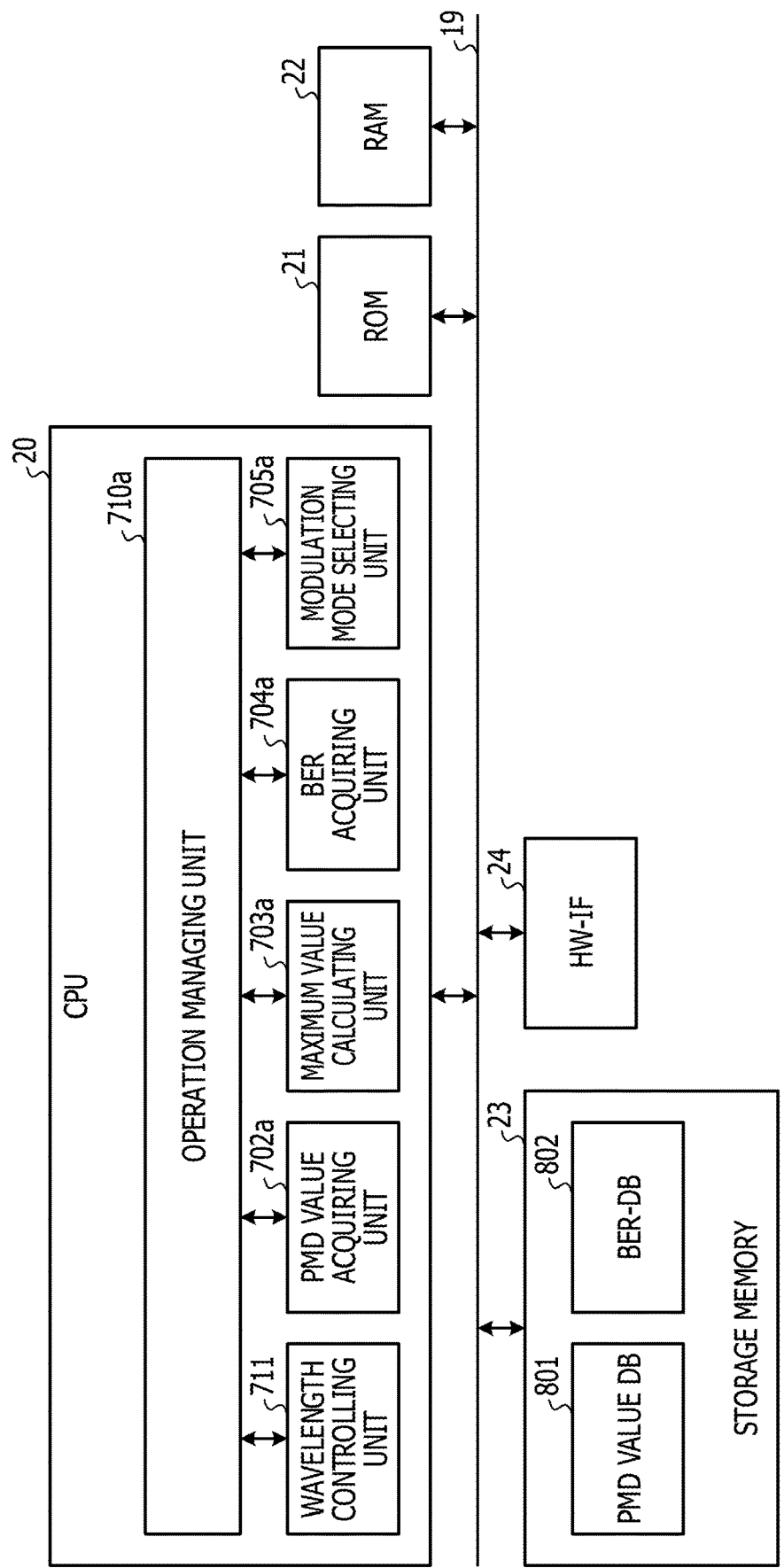
FIG. 12 is a configuration diagram illustrating another example of a device controlling unit of a receiver.

FIG. 12 is a configuration diagram illustrating another example of a device controlling unit of a receiver. The device controlling unit and the receiver illustrated by reference to FIG. 12 may be the device controlling unit 400 and the receiver 2, respectively, illustrated in FIG. 3. In FIG. 12, configurations in common with those in FIG. 9 are denoted by the same reference symbols, and description thereof is omitted.

When reading the program from the ROM 21, the CPU 20 forms, as its functions, an operation managing unit 710a, the wavelength controlling unit 711, a PMD value acquiring unit 702a, a maximum value calculating unit 703a, a BER acquiring unit 704a, and a modulation mode selecting unit 705a. The storage memory 23 stores the PMD value DB 801 and the BER-DB 802.

The operation managing unit 710a manages a series of control sequences for selecting a modulation mode. The operation managing unit 710a instructs, in accordance with the control sequences, the operation of the PMD value acquiring unit 702a, the maximum value calculating unit 703a, the BER acquiring unit 704a, and the modulation mode selecting unit 705a.

The PMD value acquiring unit 702a acquires the PMD value of each wavelength. For example, the PMD value acquiring unit 702a acquires the polarization information from the demodulation unit 403a, and calculates the PMD value of each wavelength from the polarization information. The PMD value acquiring unit 702a registers the PMD value of each wavelength in the PMD value DB 801. The PMD value acquiring unit 702a is an example of the dispersion value acquiring unit.

Similar to the above-mentioned maximum value calculating unit 703, the maximum value calculating unit 703a multiplies the mean value of the PMD values of the respective wavelengths by a prescribed ratio based on the PMD value DB 801, to thereby calculate the maximum value of the PMD value that is temporally varied. The maximum value calculating unit 703a is an example of the calculation unit.

The BER acquiring unit 704a acquires the BER of the polarization-multiplexed optical signal S in each multi-level modulation scheme. For example, the BER acquiring unit 704a acquires the error information from the FEC decoding unit 403b, and calculates the BER from the error information. The BER acquiring unit 704a registers the BER in each multi-level modulation scheme in the BER-DB 802. The BER acquiring unit 704a is an example of the quality acquiring unit.

The modulation mode selecting unit 705a selects a multi-level modulation scheme based on the BER of the polarization-multiplexed optical signal S depending on the maximum value of the PMD value. Similar to the above-mentioned modulation mode selecting unit 705, for example, the modulation mode selecting unit 705a selects a multi-level modulation scheme based on the BER-DB 802. The modulation mode selecting unit 705a is an example of a selection unit.

Figure 13:
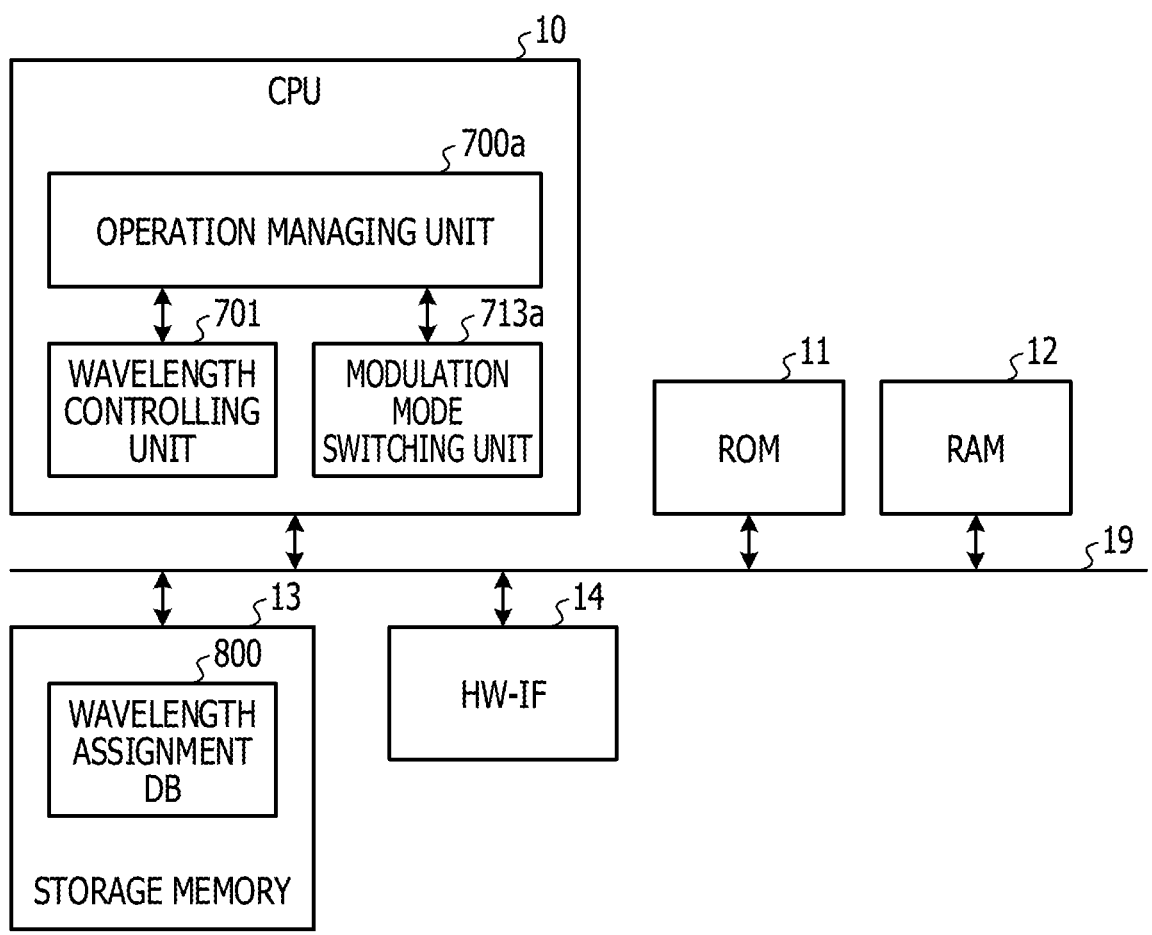
FIG. 13 is a configuration diagram illustrating another example of a device controlling unit of a transmitter.

FIG. 13 is a configuration diagram illustrating another example of a device controlling unit of a transmitter. The device controlling unit and the transmitter illustrated by reference to FIG. 13 may be the device controlling unit 300 and the transmitter 1, respectively, illustrated in FIG. 2. In FIG. 13, configurations in common with those in FIG. 4 are denoted by the same reference symbols, and description thereof is omitted.

When reading the program from the ROM 11, the CPU 10 forms, as its functions, an operation managing unit 700a, the wavelength changing unit 701, and a modulation mode switching unit 713a. The storage memory 13 stores the wavelength assignment DB 800.

The operation managing unit 700a manages a series of control sequences for selecting a modulation mode. The operation managing unit 700a instructs, in accordance with the control sequences, the operation of the wavelength changing unit 701 and the modulation mode switching unit 713a.

The modulation mode switching unit 713a switches the modulation mode of the transmitter 1 between the modulation modes #1 to #3. For example, the modulation mode switching unit 713a notifies the modulation mode setting unit 307 of the modulation mode #1, #2, or #3 represented by the control signal Sc received from the receiver 2 via the HW-IF 14.

Now, control sequences according to the present example are described.

Figure 14:
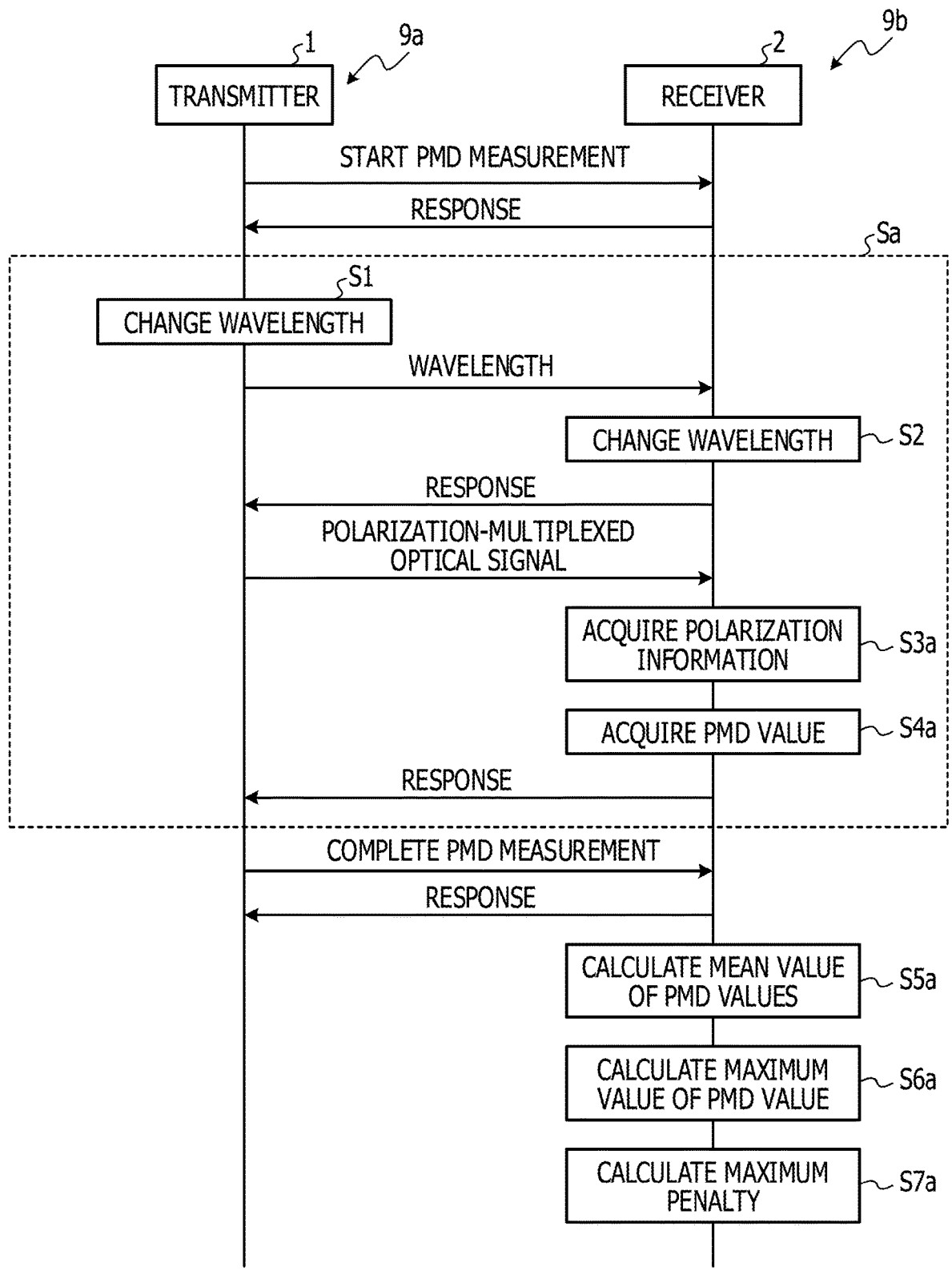
FIG. 14 is a sequence diagram (part 1) illustrating another example of control sequences between a transmitter and a receiver.
Figure 15:
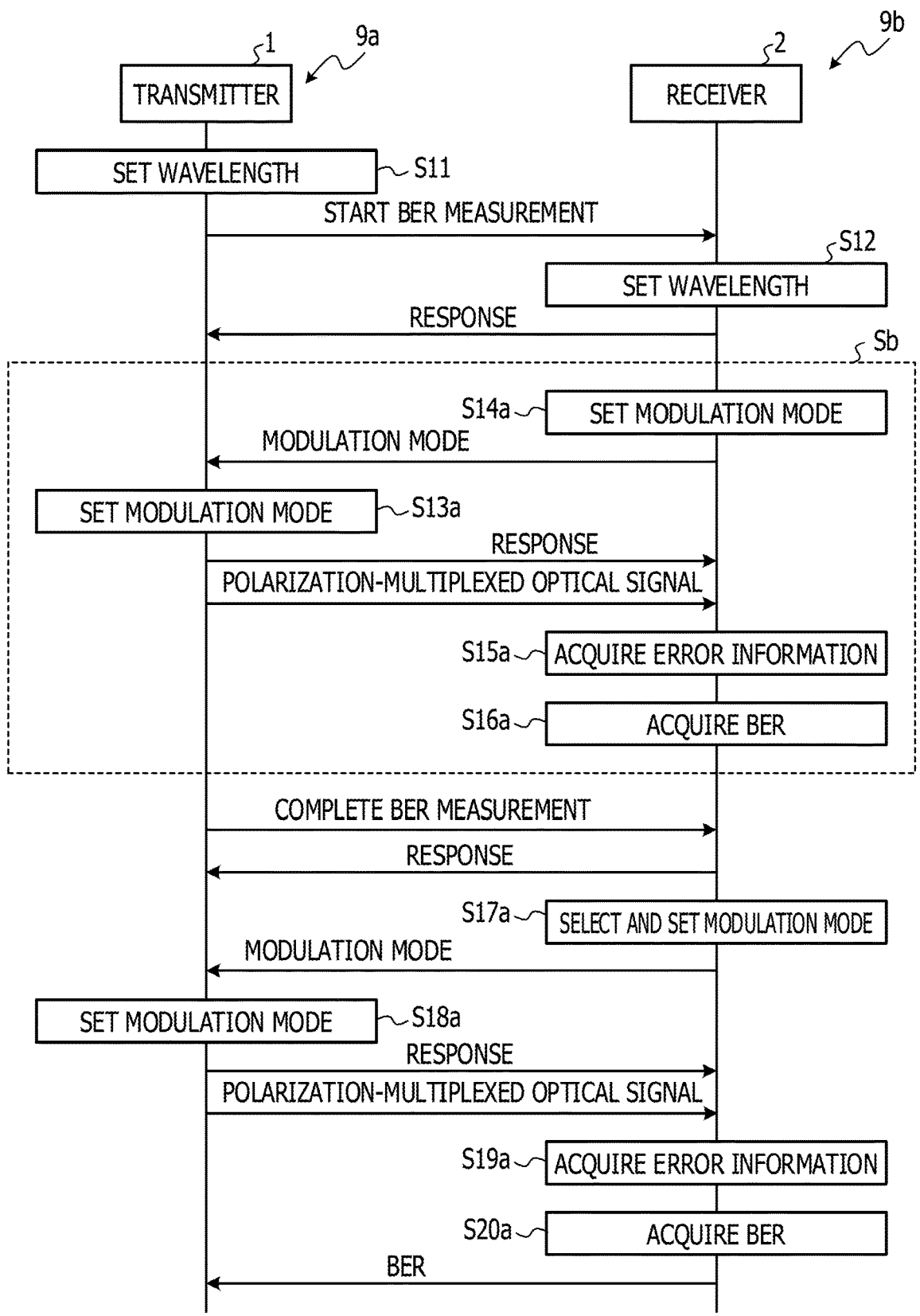
FIG. 15 is a sequence diagram (part 2) illustrating another example of control sequences between a transmitter and a receiver.

FIG. 14 and FIG. 15 are sequence diagrams illustrating another example of control sequences between a transmitter and a receiver. The transmitter and the receiver illustrated in FIG. 14 and FIG. 15 may be the transmitter 1 and the receiver 2, respectively, illustrated in FIG. 1. In FIG. 14 and FIG. 15, processes in common with those in FIG. 10 and FIG. 11 are denoted by the same reference symbols, and description thereof is omitted.

With reference to FIG. 14, in the measurement processing Sa of the PMD value, the PMD value acquiring unit 702a acquires the polarization information on each wavelength from the demodulation unit 403a (S3a), and acquires the PMD value based on the polarization information (S4a). The PMD value of each wavelength is registered in the PMD value DB 801.

After the measurement processing Sa of the PMD value is complete, the maximum value calculating unit 703a calculates the mean value of the PMD values of the respective wavelengths based on the PMD value DB 801 (S5a). Next, the maximum value calculating unit 703a multiplies the mean value of the PMD values by a prescribed ratio to calculate the maximum value of the PMD value (S6a). The maximum value calculating unit 703a calculates the maximum penalty Px' from the maximum value of the PMD value (S7a).

With reference to FIG. 15, in the measurement processing Sb of the BER, the BER acquiring unit 704a sets the modulation mode #1, #2, or #3 to the demodulation unit 403a (S14a), and notifies the transmitter 1 of the set modulation mode #1, #2, or #3.

The modulation mode switching unit 713a sets the notified modulation mode #1, #2, or #3 to the modulation unit 303b (S13a). Next, the modulation mode switching unit 713a replies a response to the notification to the receiver 2.

Next, the BER acquiring unit 704a acquires, from the FEC decoding unit 403b, the error information on the polarization-multiplexed optical signal S from the transmitter 1 (S15a), and acquires the BER from the error information (S16a). The BER in each of the modulation modes #1 to #3 is registered in the BER-DB 802.

After the measurement processing Sb of the BER is complete, by the method described above, the modulation mode selecting unit 705a selects the modulation mode #1, #2, or #3 and notifies the modulation mode setting unit 407 of the selected one, to thereby set the selected modulation mode #1, #2, or #3 to the demodulation unit 403a (S17a). The modulation mode selecting unit 705a notifies the transmitter 1 of the selected modulation mode.

The modulation mode switching unit 713a notifies the modulation mode setting unit 307 of the notified modulation mode to set the modulation mode (S18a). Next, the modulation mode switching unit 713a replies a response to the notification to the receiver 2.

Next, the BER acquiring unit 704a acquires, from the FEC decoding unit 403b, the error information on the polarization-multiplexed optical signal S from the transmitter 1 (S19a), and acquires the BER from the error information (S20a). The BER acquiring unit 704a notifies the transmitter 1 of the BER. When the BER is a prescribed reference value or smaller, for example, the operation managing unit 700 of the transmitter 1 makes the transmitter 1 shift to the operation state. When the BER exceeds the prescribed reference value, the operation managing unit 700 executes the control sequences again. In this way, the control sequences are executed.

As described so far, the PMD value acquiring units 702 and 702a acquire the PMD value of each wavelength, and the maximum value calculating units 703 and 703a multiply the mean value of the PMD values of the respective wavelengths by a prescribed ratio, to thereby calculate the maximum value of the PMD value that is temporally varied. The modulation mode selecting units 705 and 705a select a multi-level modulation scheme based on the BER of the polarization-multiplexed optical signal S depending on the maximum value of the PMD value.

The above-mentioned configuration allows the maximum value calculating units 703 and 703a to easily calculate the maximum value of the PMD value without performing measurement for a long period of time. The maximum value of the PMD value is calculated from the actually measured PMD values, and hence is more accurate than the one estimated based on a design value such as the specified value of the optical fiber. The modulation mode selecting units 705 and 705a may thus select an appropriate multi-level modulation scheme depending on the maximum value of the PMD value.

The embodiment described above is a preferred example for embodying the present technology. The present invention is, however, not limited thereto, and various modifications may be made thereto within the range not departing from the gist of the present technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
a memory; and
a processor coupled to the memory and configured to:
acquire a polarization mode dispersion value of a plurality of wavelengths of a polarization-multiplexed optical signal having a wavelength;
multiply a mean value of the polarization mode dispersion values of the wavelengths by a prescribed ratio, to thereby calculate a maximum value of the polarization mode dispersion value that is temporally varied; and
select a multi-level modulation scheme of the polarization-multiplexed optical signal based on an index value of transmission quality of the polarization-multiplexed optical signal and the maximum value.

2. The transmission device according to claim 1, wherein the processor is configured to:
acquire the index value of a plurality of multi-level modulation schemes; and
correct the index value in each of the multi-level modulation schemes based on a polarization mode dispersion value of the polarization-multiplexed optical signal having the wavelength with a prescribed value, and the maximum value, to thereby select the multi-level modulation scheme from the corrected index value.

3. The transmission device according to claim 1, further comprising: a transmitter configured to transmit the polarization-multiplexed optical signal for acquiring a polarization mode dispersion value to a transmission path, wherein the processor is configured to change the wavelength of the polarization-multiplexed optical signal at a prescribed interval, and change a transmission band of a wavelength filter on the transmission path based on the wavelength.

4. The transmission device according to claim 3, wherein the prescribed interval is set based on autocorrelation of a polarization mode dispersion value related to the wavelength.

5. The transmission device according to claim 1, wherein the processor is configured to change the wavelength of the polarization-multiplexed optical signal at a prescribed interval while avoiding a wavelength that another polarization-multiplexed optical signal is using.

6. The transmission device according to claim 5, wherein the prescribed interval is set based on autocorrelation of a polarization mode dispersion value related to the wavelength.

7. A selection method for a modulation scheme that a transmission device executes, the selection method comprising:
acquiring a polarization mode dispersion value of a plurality of wavelengths of a polarization-multiplexed optical signal having a wavelength;
multiplying a mean value of the polarization mode dispersion values of the wavelengths by a prescribed ratio, to thereby calculate a maximum value of the polarization mode dispersion value that is temporally varied; and
selecting a multi-level modulation scheme of the polarization-multiplexed optical signal based on an index value of transmission quality of the polarization-multiplexed optical signal and the maximum value.

8. The selection method according to claim 7, further comprising:
acquiring the index value in a plurality of multi-level modulation schemes; and
correcting the index value in each of the multi-level modulation schemes based on a polarization mode dispersion value of the polarization-multiplexed optical signal having the wavelength with a prescribed value, and the maximum value, to thereby select the multi-level modulation scheme from the corrected index value.

9. The selection method according to claim 7, further comprising:
transmitting the polarization-multiplexed optical signal for acquiring a polarization mode dispersion value to a transmission path;
changing the wavelength of the polarization-multiplexed optical signal at a prescribed interval; and changing a transmission band of a wavelength filter on the transmission path based on the wavelength.

10. The selection method according to claim 9, wherein the prescribed interval is set based on autocorrelation of a polarization mode dispersion value related to the wavelength.

11. The selection method according to claim 9, further comprising:
changing the wavelength of the polarization-multiplexed optical signal at a prescribed interval while avoiding a wavelength that another polarization-multiplexed optical signal is using.

12. The selection method according to claim 11, wherein the prescribed interval is set based on autocorrelation of a polarization mode dispersion value related to the wavelength.

* * * * *